(12) United States Patent
Jenkins et al.

(10) Patent No.: US 7,521,523 B2
(45) Date of Patent: Apr. 21, 2009

(54) OXYGEN-SCAVENGING POLYESTER COMPOSITIONS USEFUL IN PACKAGING

(75) Inventors: Jason Christopher Jenkins, Kingsport, TN (US); Rebekah Fauver Morrow, Kingsport, TN (US); Mark Edward Stewart, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 132 days.

(21) Appl. No.: 11/646,729

(22) Filed: Dec. 28, 2006

(65) Prior Publication Data

US 2008/0161472 A1 Jul. 3, 2008

(51) Int. Cl.
*C08G 63/02* (2006.01)

(52) U.S. Cl. .................... 528/272; 502/150; 502/152; 528/271

(58) Field of Classification Search .............. 528/271, 528/272, 150, 152
See application file for complete search history.

(56) References Cited

U.S. PATENT DOCUMENTS

| | | | |
|---|---|---|---|
| 2,388,318 A | 11/1945 | Frosch et al. | |
| 3,055,952 A | 9/1962 | Goldberg | |
| 3,723,574 A | 3/1973 | Brinkmann et al. | |
| 3,796,762 A | 3/1974 | Verdol et al. | |
| 4,031,065 A | 6/1977 | Cordes et al. | |
| 4,039,593 A | 8/1977 | Kamienski et al. | |
| 4,081,496 A | 3/1978 | Finlayson | |
| 4,219,527 A | 8/1980 | Edelman et al. | |
| 4,224,207 A | 9/1980 | Falk | |
| 4,299,927 A | 11/1981 | Dombroski | |
| 4,412,018 A | 10/1983 | Finlayson et al. | |
| 4,617,374 A | 10/1986 | Pruett et al. | |
| 4,947,339 A | 8/1990 | Czekajewski et al. | |
| 4,957,980 A | 9/1990 | Kobayashi et al. | |
| 5,021,515 A | 6/1991 | Cochran et al. | |
| 5,091,462 A | 2/1992 | Fukui et al. | |
| 5,211,875 A | 5/1993 | Speer et al. | |
| 5,310,497 A | 5/1994 | Ve Speer et al. | |
| 5,314,987 A | 5/1994 | Kim et al. | |
| 5,342,892 A | 8/1994 | Vanderbilt et al. | |
| 5,346,644 A | 9/1994 | Speer et al. | |
| 5,350,622 A | 9/1994 | Speer et al. | |
| 5,399,289 A | 3/1995 | Speer et al. | |
| 5,405,911 A | 4/1995 | Handlin, Jr. et al. | |
| 5,432,230 A | 7/1995 | Vanderbilt et al. | |
| 5,439,719 A | 8/1995 | Grosse-Puppendahl et al. | |
| 5,529,833 A | 6/1996 | Speer et al. | |
| 5,639,815 A | 6/1997 | Cochran et al. | |
| 5,660,761 A | 8/1997 | Katsumoto et al. | |
| 5,665,454 A | 9/1997 | Hosoi et al. | |
| 5,700,554 A | 12/1997 | Speer et al. | |
| 5,859,145 A | 1/1999 | Ching et al. | |
| 5,955,527 A | 9/1999 | Cochran et al. | |
| 6,057,396 A | 5/2000 | Lan et al. | |
| 6,083,585 A | 7/2000 | Cahill et al. | |
| 6,197,851 B1 | 3/2001 | Maxwell et al. | |
| 6,254,803 B1 | 7/2001 | Matthews et al. | |
| 6,254,804 B1 | 7/2001 | Matthews et al. | |
| 6,365,659 B1 | 4/2002 | Aoyama et al. | |
| 6,410,156 B1 | 6/2002 | Akkapeddi et al. | |
| 6,423,776 B1 | 7/2002 | Akkapeddi et al. | |
| 6,454,965 B1 | 9/2002 | Ching et al. | |
| 6,527,976 B1 | 3/2003 | Cai et al. | |
| 6,544,611 B2 | 4/2003 | Schiraldi et al. | |
| 6,559,205 B2 | 5/2003 | Cai et al. | |
| 6,572,783 B1 | 6/2003 | Cai et al. | |
| 6,582,869 B2 * | 6/2003 | Daimon et al. ............ | 430/109.4 |
| 6,610,215 B1 | 8/2003 | Cai et al. | |
| 6,777,479 B1 | 8/2004 | Bernard et al. | |
| 6,780,916 B2 | 8/2004 | Tung et al. | |
| 6,872,451 B2 | 3/2005 | Ebner et al. | |
| 6,875,400 B2 | 4/2005 | Speer et al. | |
| 6,908,652 B1 | 6/2005 | Miranda et al. | |
| 6,911,122 B2 | 6/2005 | Cook, Jr. et al. | |
| 6,986,864 B2 | 1/2006 | Porter | |
| 7,014,970 B2 | 3/2006 | Morimoto et al. | |
| 2001/0002737 A1 * | 6/2001 | Branum ...................... | 264/165 |
| 2003/0012896 A1 | 1/2003 | Ching et al. | |

(Continued)

FOREIGN PATENT DOCUMENTS

DE 1694216 A1 4/1971

(Continued)

OTHER PUBLICATIONS

Binns, F. et al, "Studies leading to large scale synthesis of polyesters using enzymes," J. Chem. Soc., Perkin Trans. 1, 1999, pp. 2671-2676, Aug. 1999.

(Continued)

*Primary Examiner*—Terressa M Boykin
(74) *Attorney, Agent, or Firm*—Michael K. Carrier; Bernard J. Graves, Jr.

(57) ABSTRACT

Oxygen-scavenging polyester compositions are disclosed that comprise one or more polyesters having incorporated therein residues of 3-hexenedioic acid and terephthalic acid. The compositions may further comprise residues of one or more aliphatic dicarboxylic acids such as adipic acid. One or more of the polyesters of the compositions may comprise significant amounts of repeating units of polyethylene terephthalate as homopolymers or copolymers, making them suitable for us in packaging compositions having oxygen-scavenging properties.

24 Claims, No Drawings

U.S. PATENT DOCUMENTS

| | | |
|---|---|---|
| 2003/0040564 A1 | 2/2003 | Tung et al. |
| 2003/0108702 A1 | 6/2003 | Tung et al. |
| 2004/0129554 A1 | 7/2004 | Solis et al. |
| 2004/0178386 A1 | 9/2004 | Tung et al. |
| 2004/0185198 A1 | 9/2004 | Sisson et al. |
| 2005/0048285 A1 | 3/2005 | Ebner et al. |
| 2005/0048286 A1 | 3/2005 | Ebner et al. |
| 2005/0048287 A1 | 3/2005 | Ebner et al. |
| 2005/0085577 A1 | 4/2005 | Ching et al. |
| 2005/0139806 A1 | 6/2005 | Havens et al. |
| 2005/0159526 A1 | 7/2005 | Bernard et al. |
| 2005/0176881 A1 | 8/2005 | Bheda et al. |
| 2005/0261126 A1 | 11/2005 | Ferrari et al. |
| 2006/0069197 A1 | 3/2006 | Tammaji et al. |
| 2006/0116452 A1 | 6/2006 | Tsuji et al. |
| 2006/0211811 A1 | 9/2006 | Goto et al. |

FOREIGN PATENT DOCUMENTS

| | | |
|---|---|---|
| DE | 2420359 A1 | 11/1975 |
| EP | 0650994 | 5/1995 |
| EP | 1 031 385 A2 | 8/2000 |
| EP | 1 113 076 A2 | 7/2001 |
| JP | 46-43262 B | 12/1971 |
| WO | WO 84/03096 | 8/1984 |
| WO | WO 99/15432 | 4/1999 |
| WO | WO 99/38914 | 8/1999 |
| WO | WO 99/49863 | 9/1999 |
| WO | WO 2006/113175 | 10/2006 |

OTHER PUBLICATIONS

Olson, D. and Sheares, V., "Preparation of Novel Functionalized Aliphatic Polyesters through Condensation Polymerization," Polymer Preprints 2005, 46(2), p. 989.

Olson, D. and Sheares, V., "Preparation of Unsaturated Linear Aliphatic Polyesters Using Condensation Polymerization," Macromolecules 2006, 39, pp. 2808-2814, Mar. 2006.

Saini, D. and Desautel, M., "An Exciting New Non-Invasive Technology for Measuring Oxygen in Sealed Packages the OxySense™ 101", presented at Worldpak 2002, published by CRC Press, Boca Raton, FL, Jun. 2002.

BP Amoco Chemical Company, Notification for New Use of a Food Contact Substance (1,3-Butadiene, homopolymer, hydroxy-terminated) before the Food and Drug Administration, Department of Health and Human Services, Apr. 2001.

Co-pending U.S. Appl. No. 11/646,731, filed Dec. 28, 2006.

Co-pending U.S. Appl. No. 11/646,696, filed Dec. 28, 2006.

Office Communication date of mailing Oct. 9, 2007 recieved on co-pending U.S. Appl. No. 10/757,959.

Notification of Transmittal of the International Search Report and the Written Opinion of the International Searching Authority, or the Declaration date of mailing Apr. 16, 2008 on PCT/US2007/025325.

Notification of Transmittal of the International Search Report and the Written Opinion of the International Searching Authority, or the Declaration date of mailing May 6, 2008 on PCT/US2007/025275.

Notification of Transmittal of the International Search Report and the Written Opinion of the International Searching Authority, or the Declaration date of mailing May 7, 2008 on PCT/US2007/025323.

* cited by examiner

OXYGEN-SCAVENGING POLYESTER COMPOSITIONS USEFUL IN PACKAGING

FIELD OF THE INVENTION

The present invention relates to oxygen-scavenging polyester compositions, to methods of making them, and to their use in packaging to provide packaging compositions having improved oxygen-scavenging properties.

BACKGROUND OF THE INVENTION

Many food and beverage products are sensitive to oxygen and suffer significant deterioration upon exposure to even very low levels of oxygen. Limiting the exposure of such oxygen-sensitive articles to oxygen maintains the quality and improves the shelf life of these articles. By limiting the oxygen exposure of oxygen-sensitive food articles in the packaging system, the quality of the food articles is maintained and spoilage is reduced. Such packaging thus keeps the article in inventory longer, thereby reducing restocking costs, and costs incurred from waste.

Polyester polymers, and especially polyethylene terephthalate (PET) homopolymers and copolymers, are commonly used in packaging applications. PET has a number of valuable properties for packaging but lacks sufficient gas barrier for some applications, limiting its use in packaging for oxygen-sensitive products such as beer, fruit juices, citrus products, tomato-based products, and aseptically packed meat. Multilayer structures have been proposed in order to improve PET's gas barrier. Polymers that have excellent oxygen barrier (passive barrier) or scavenging properties (active barrier) may be combined with PET to produce a layered structure consisting of the individual polymers. Blends of barrier polymers with PET have also been used to improve the oxygen barrier of packages.

m-Xylylene diamine adipate, a polyamide consisting of repeating units derived from m-xylylene diamine and adipic acid, can be blended with PET to provide packaging that is somewhat resistant to encroachment of oxygen. Transition metal salts, such as cobalt salts, can be added to the polyamide, or blends of PET and the polyamide, to catalyze and actively promote the oxidation of the polyamide polymer, thereby further enhancing the oxygen barrier characteristics of the package. The use of active oxygen scavengers, which chemically remove oxygen migrating through the walls of the package, can be a very effective method to reduce the oxygen transmission rates of plastics used in packaging. However, a drawback associated with its use is that an extended "induction time" is often present before full scavenging activity is achieved. This deficiency may be partially addressed by increasing the level of the polyamide in the packaging. However, this may increase the cost of the final package, and may produce undesirable effects on the appearance of the package, such as adding haze or unwanted color. Increasing the concentration of such oxygen scavengers may also complicate manufacture and recycling of the package.

U.S. Pat. No. 2,388,318 discloses unsaturated polyesters comprised of dicarboxylic acids containing unsaturated carbon-to-carbon bonds which are not conjugated with other unsaturated carbon-to-carbon bonds or with the carbon-to-oxygen double bonds of a carboxyl group, for example dihydromuconic acid. The polyesters are prepared with a slight excess of a saturated glycol, and optionally with a saturated dicarboxylic acid.

JP 46043262 discloses a fiber molded from polyester in which at least 80% of the repeating structural units are ethylene terephthalate, and which has carbon-carbon unsaturated bonds. A compound having unsaturated bonds is used in an amount of 0.5-10 mole % with respect to the repeating units of the polyester. These modified polyesters are then grafted to improve the dyeability, pilling resistance, and antistatic properties of the fiber.

U.S. Pat. No. 4,299,927 discloses polymer compositions that comprise from about 75 to about 99% by weight of the reaction product of (a) from about 50 to about 90% by weight, based on the weight of the reaction product, of an ethylenically unsaturated polyester derived from an $\alpha,\beta$-ethylenically unsaturated dicarboxylic acid with a saturated aliphatic polyol, and (b) from about 50 to about 10% by weight, based on the weight of the reaction product, of a modified polyolefin derived from an $\alpha,\beta$-ethylenically unsaturated dicarboxylic acid anhydride and a polyolefin.

U.S. Pat. No. 5,399,289 discloses compositions for scavenging oxygen that comprise an ethylenically unsaturated hydrocarbon polymer which has 0.01-1.0 equivalents of carbon-carbon double bonds per 100 g of polymer and a transition metal catalyst and can be incorporated into various types of layers.

U.S. Pat. No. 5,639,815 discloses a wall for a package that includes a layer that includes a polymer and is capable of scavenging oxygen through the metal-catalyzed oxidation of an oxidizable organic component thereof. The oxidizable organic component is preferably itself a polymer, and may be the only polymer in the composition. Preferred compositions include a blend of 96% polyethylene terephthalate and 4% poly (m-xylyleneadipamide) containing 200 ppm cobalt as catalyst, which is said to have good permeance-versus-time performance when formed into a bottle.

U.S. Pat. No. 5,859,145 discloses a process for esterifying and/or transesterifying a polymer having a polyethylenic backbone and pendant acid and/or ester moieties, the process comprising contacting a melt of the polymer with a transesterifying compound so that the polymer undergoes esterification and/or transesterification but not alcoholysis. The esterified or transesterified polymer also has pendant ester moieties which differ in kind and/or number from the unreacted polymer. The process may include adding an amount of a transition metal salt that is effective to promote oxygen scavenging. Also disclosed are compositions that include a component comprising an ethylenic or polyethylenic backbone and a pendant or terminal moiety comprising a benzylic, allylic, or ether-containing radical.

U.S. Pat. No. 6,083,585 discloses compositions that include condensation copolymers comprising predominantly polyester segments and an oxygen scavenging amount of polyolefin oligomer segments. The polyester segments comprise segments derived from typical bottling and packaging polyesters such as PET and PEN. The copolymers are preferably formed by transesterification during reactive extrusion and typically comprise about 0.5 to about 12 wt % of polyolefin oligomer segments.

U.S. Pat. No. 6,780,916 discloses a resin composition that provides good optical properties when stretched, and efficient oxygen-scavenging, the resin composition comprising a film-forming polyester and an effective amount of oxygen-scavenging particles having a particle size distribution such that particles of less than about 25 microns in size do not exceed a concentration defined by a formula that includes the apparent density of the particles. Suitable diols for use in the polymers described are said to include 1,4-butenediol.

There remains a need in the art for polyester compositions having oxygen-scavenging properties, and especially those comprising substantial amounts of terephthalic acid, making them suitable for use in packaging applications.

SUMMARY OF THE INVENTION

In one aspect, the invention relates to oxygen-scavenging polyester compositions that include residues of 3-hexenedioic acid, present in the compositions in amounts that may range widely, for example from about 0.01 mole percent to 50 mole percent, based on the total amount of dicarboxylic acids in the polyesters of the polyester compositions comprising 100 mole percent. The polyester compositions of the invention further comprise residues of aromatic dicarboxylic acids, and especially terephthalic acid, present in the oxygen-scavenging polyester compositions in amounts of, for example, at least 50 mole percent, based on the total amount of dicarboxylic acids in the polyesters of the compositions comprising 100 mole percent.

According to the invention, the residues of 3-hexenedioic acid provide oxygen-scavenging effects, especially when combined with one or more transition metal oxidation catalysts, as further described herein. The residues of terephthalic acid present in the compositions provide properties that make the compositions suitable for use in packaging.

In one aspect, the residues of 3-hexenedioic acid may be present in the oxygen-scavenging polyester compositions in relatively small amounts, making them especially suitable for use in packaging, for example in amounts from about 0.01 mole percent to about 10 mole percent, incorporated for example into a polyethylene terephthalate polymerization process to prepare a polyethylene terephthalate copolymer having oxygen-scavenging effect. Alternatively, the residues of 3-hexenedioic acid may be provided in greater amounts in a polymer that is then blended with one or more polyethylene terephthalate homopolymers or copolymers to prepare polyester compositions suitable for use in packaging.

Thus, in another aspect, the invention relates to oxygenscavenging polyester compositions, suitable for use in packaging, that comprise one or more polyethylene terephthalate homopolymers or copolymers (also described hereinafter simply as "PET polymers"), present in an amount, for example, of at least 75 wt. %, or at least 85 wt. %, or at least 92 wt. %, or at least 95 wt %, or more, with respect to the total weight of the polyester compositions. These oxygen-scavenging polyester compositions further comprise residues of 3-hexenedioic acid, in amounts, for example, as already described The residues of 3-hexenedioic acid may be provided to the polyester compositions of the invention as oxygen-scavenging concentrates that comprise relatively large amounts, for example from about 5 mole percent to about 100 mole percent 3-hexenedioic acid, based on the total residues of dicarboxylic acid in the oxygen-scavenging polyester concentrate comprising 100 mole percent. These oxygen-scavenging polyester concentrates may be used to provide oxygen-scavenging effects when blended with significant amounts of one or more additional polyesters, and especially when blended with one or more polyethylene terephthalate homopolymers or copolymers.

The oxygen-scavenging polyester concentrates just described may optionally include residues of adipic acid ("adipate residues"), for example in amounts from about 5 mole percent to about 95 mole percent or more, based on the total amount of dicarboxylic acids in the oxygen-scavenging polyester concentrate comprising 100 mole percent. When the oxygen-scavenging polyester concentrates are prepared with significant amounts of adipic acid, polymerization of the oxygen-scavenging polyester concentrates is satisfactory at temperatures lower than those at which typical packaging polyesters such as polyethylene terephthalate homopolymers and copolymers are prepared. Thus these oxygen-scavenging concentrates may provide improved oxygen-scavenging effects when subsequently added to one or more polyesters to produce the oxygen scavenging polyester compositions of the invention, when compared with the oxygen scavenging polyester compositions produced at higher polymerization temperatures, such as polyethylene terephthalate homopolymers and copolymers, and in which the residues of 3-hexenedioic acid are directly incorporated into the polyesters during polymerization.

These concentrates may further comprise residues of one or more additional dicarboxylic acids, whether aliphatic, alicyclic, or aryl dicarboxylic acids, and residues of one or more aliphatic, alicyclic, or aryl diols, and especially aliphatic diol residues such as those from ethylene glycol.

In various aspects, the oxygen-scavenging polyester concentrates may be present in the polyester compositions of the invention in amounts, for example up to about 5 weight percent or more, or up to 2 weight percent, or up to 1 weight percent, in each case with respect to the total weight of the polyester blends.

The polyester compositions of the invention may further comprise, as an oxidation catalyst, a transition metal present, for example, in an amount from about 10 ppm to about 1,000 ppm metal, with respect to the total weight of the polyester compositions. The polyester compositions of the invention just described are suitable for packaging, and exhibit oxygen-scavenging properties while retaining the properties that make the compositions suitable for use in a variety of packaging applications, and especially for use as bottle preforms and blow-molded bottles.

Thus, in one aspect, the invention relates to polyester compositions comprising residues of 3-hexenedioic acid present in an amount from about 0.01 mole percent to about 50 mole percent, and residues of terephthalic acid present in an amount of at least 50 mole percent, based on the total amount of residues of dicarboxylic acid in the polyester composition comprising 100 mole percent. Alternatively, the residues of 3-hexenedioic acid may be present in an amount from about 0.05 mole percent to about 10 mole percent, or in an amount from about 0.1 mole percent to about 2 mole percent.

In other aspects, the residues of terephthalic acid may be present in an amount of at least 75 mole percent, or in an amount of at least 80 mole percent, or at least 90 mole percent, or at least 95 mole percent, in each case based on the total amount or residues of dicarboxylic acid or anhydride in the polyester composition comprising 100 mole percent.

In another aspect, the compositions may further comprise residues of one or more of: oxalic acid or anhydride; malonic acid or anhydride; succinic acid or anhydride; glutaric acid or anhydride; adipic acid or anhydride; pimelic acid or anhydride; suberic acid or anhydride, azelaic acid or anhydride; sebacic acid or anhydride; undecandoioic acid or anhydride; or dodecandioic acid or anhydride. In another aspect, the compositions may comprise residues of adipic acid, present in an amount up to about 50 mole percent, or from about 0.1 mole percent up to about 20 mole percent, or in an amount from about 0.2 mole percent up to about 5 mole percent, in each case based on the total amount of residues of dicarboxylic acid or anhydride in the polyester composition comprising 100 mole percent.

In another aspect, in addition to terephthalic acid residues, the polyester compositions of the invention may further comprise residues of one or more additional aromatic dicarboxylic acids having from 8 to 14 carbon atoms, or may further comprise residues of one or more of isophthalic acid or naphthalene dicarboxylic acid in a combined amount of up to about 10 mole percent, or may comprise residues of one or more aliphatic diols having from 2 to 20 carbon atoms.

In yet other aspects, the compositions of the invention may further comprises residues of ethylene glycol, in an amount of at least 30 mole percent, or in an amount of at least 80 mole percent, or in an amount of at least 95 mole percent, based on the total amount of residues of diols in the polyester composition comprising 100 mole percent.

In a further aspect, the compositions of the invention may further comprise up to about 20 mole percent diethylene glycol (DEG) residues, or up to about 5 mole percent diethylene glycol (DEG) residues, based on the total amount of residues of diols in the polyester composition comprising 100 mole percent.

In yet another aspect, the polyester compositions of the invention may further comprise residues of one or more of 1,4-cyclohexanedimethanol; 2,2-bis-(4-hydroxycyclohexyl)-propane; or 2,4-dihydroxy-1,1,3,3-tetramethyl-cyclobutane. In another aspect, the polyester compositions of the invention may further comprise residues of 1,4-cyclohexanedimethanol present in an amount up to 20 mole percent, in each case based on the total amount of residues of diols in the polyester composition comprising 100 mole percent.

In a further aspect, the compositions of the invention may further comprise one or more transition metals present in an amount from about 10 ppm to about 1,000 ppm, based on the total weight of the polyester composition, or in an amount from 20 ppm to 750 ppm, or in an amount from 25 ppm to 500 ppm, based on the total weight of the polyester composition. In these embodiments, the one or more transition metals may comprise, for example, one or more transition metal salts. In yet another aspect, the one or more transition metals may comprise one or more of: manganese II or III, iron II or III, cobalt II or III, nickel II or III, copper I or II, rhodium II, III or IV, or ruthenium I, II or IV. In yet another such aspect, the one or more transition metals is provided as one or more of a chloride, an acetate, an acetylacetonate, a stearate, a palmitate, a 2-ethylhexanoate, a neodecanoate, or a naphthenate.

In various aspects, the residues of terephthalic acid are provided to the compositions by one or more polyethylene terephthalate homopolymers or copolymers provided in an amount, for example, of at least 75 weight percent, or at least 90 weight percent, or at least 95 weight percent, in each case based on the total weight of the polyester composition. In such aspects the one or more polyethylene terephthalate homopolymers or copolymers may be comprised of units of polyethylene terephthalate in an amount of at least 75 mole percent, based on the total moles of dicarboxylic acid/diol units in the one or more polyethylene terephthalate homopolymers or copolymers comprising 100 mole percent. In another aspect, the one or more polyethylene terephthalate homopolymers or copolymers used may further comprise residues of one or more of: phthalic acid, isophthalic acid, naphthalene-2,6-dicarboxylic acid, or diphenyl-4,4'-dicarboxylic acid, and may further comprise residues of one or more of: ethylene glycol, diethylene glycol (DEG); triethylene glycol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); or hexanediol-(1,3).

In another aspect, the residues of 3-hexenedioic acid are provided to the compositions of the invention as a polyester comprising residues of 3-hexenedioic acid in an amount from about 5 mole percent up to 100 mole percent; optionally, residues of adipic acid in an amount up to 95 mole percent; and ethylene glycol present in an amount at least 50 mole percent, based on a total amount of 100 mole percent of dicarboxylic acid residues and 100 mole percent diol residues in the polyester composition.

In yet another aspect, the intrinsic viscosity of the polyester compositions according to the invention are from 0.55 dL/g to 1.15 dL/g. In another aspect, the melting point of the compositions of the invention is about 265° C. or less.

The polyester compositions of the invention may be in a variety of forms, for example in the form of a blow-molded bottle, or a bottle preform.

In yet another aspect, the invention relates to polyester compositions comprising residues of 3-hexenedioic acid in an amount from 0.05 mole percent to 2 mole percent, and residues of terephthalic acid in an amount of at least 95 mole percent, based on the total amount of dicarboxylic acid residues in the polyester blend comprising 100 mole percent, and residues of ethylene glycol, in an amount of at least 95 mole percent, based on the total amount of residues of diols in the polyester composition comprising 100 mole percent.

Further aspects of the invention are as set out below.

DETAILED DESCRIPTION OF THE INVENTION

The present invention may be understood more readily by reference to the following detailed description of the invention and the examples provided therein.

As used in the specification and the appended claims, the singular forms "a," "an" and "the" include plural referents unless the context clearly dictates otherwise. For example, reference to processing or making a "polymer," "preform," "article," "container," or "bottle" is intended to include the processing or making of a plurality of polymers, preforms, articles, containers or bottles. References to a composition containing or including "an" ingredient or "a" polymer is intended to include other ingredients or other polymers, respectively, in addition to the one named.

The intrinsic viscosity values described throughout this description, unless otherwise indicated, are set forth in dL/g units as calculated from the inherent viscosity measured at 25° C. in 60/40 wt/wt phenol/tetrachloroethane, as further described below.

By "comprising" or "containing" or "including" we mean that at least the named compound, element, particle, or method step, etc., is present in the composition or article or method, but does not exclude the presence of other compounds, catalysts, materials, particles, method steps, etc, even if the other such compounds, material, particles, method steps, etc., have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps or ingredients is a convenient means for identifying discrete activities or ingredients and the recited lettering can be arranged in any sequence, unless otherwise indicated.

It should be further understood that, as used herein, the terms "dicarboxylic acid" and "dicarboxylate" are intended to encompass the corresponding acid anhydrides, esters, and acid chlorides. Thus, the term "residues of dicarboxylic acids" includes those provided to a polymer reaction as an acid, an anhydride, a mono- or di-ester, an acid chloride, or combinations of any of these.

It should be understood also that the word "about" when used to describe a number or range is intended also to include the exact number or range which the word is used to modify.

In one aspect, the invention relates to oxygen-scavenging polyester compositions, that include residues of 3-hexenedioic acid and residues of terephthalic acid, that are useful for packaging, especially when the terephthalic acid residues are provided by one or more polyethylene terephthalate homopolymers or copolymers ("PET polymers"), the compositions being further characterized as having improved oxygen-scavenging properties.

Thus, in another aspect, the polyester compositions of the invention are comprised of polyester concentrates, in which the concentrates comprise relatively large amounts of residues of 3-hexenedioic acid.

In another aspect, the invention relates to processes of making polyester compositions, whether by direct polymerization, by blending of an oxygen-scavenging concentrate with polyesters such as one or more PET homopolymers or copolymers, and to processes of making packaging from such polyester compositions having oxygen-scavenging properties.

In yet another aspect, the invention relates to packaging made from the polyester compositions just described, and to methods of making such packaging, and especially to preforms and to blow-molded articles, such as bottles, that comprise the polyester compositions just described.

In one aspect, the present invention relates to oxygen-scavenging polyester compositions, useful in packaging compositions, the compositions comprising one or more polyesters having incorporated therein residues of 3-hexenedioic acid, and residues of terephthalic acid.

The term "residues of 3-hexenedioic acid" as used herein is intended to include residues derived from 3-hexenedioic acid, Chem. Abs. No. 4436-74-2, whether the cis or trans conformation, as well as the corresponding acid anhydrides, esters, and acid chlorides. 3-hexenedioic acid is also known as β-hydromuconic acid, dihydromuconic acid, and 2-butene-1,4-dicarboxylic acid.

The total amount of residues of 3-hexenedioic acid in the oxygen-scavenging polyester compositions may vary within a broad range, for example from about 0.01 mole percent to about 50 mole percent, or more, based on the total amount of dicarboxylic acids in the oxygen-scavenging polyester compositions comprising 100 mole percent.

The polyester compositions of the invention may be provided with the residues of 3-hexenedioic acid in the form of polyesters having relatively large amounts, for example from about 5 mole percent to 100 mole percent, or from 10 mole percent to 95 mole percent, for example, residues of 3-hexenedioic acid. These polyesters, which may be considered concentrates, may then be blended with significant amounts of one or more additional polyesters, and especially with one or more polyethylene terephthalate homopolymers or copolymers, to obtain the polyester compositions of the invention. Such oxygen-scavenging polyester concentrates may optionally include residues of one or more aliphatic acids such as adipic acid (also described herein as "adipate residues"), for example, in amounts from about 5 mole percent to about 95 mole percent or more, based on the total amount of dicarboxylic acids in these oxygen-scavenging polyester concentrates comprising 100 mole percent. For example, when oxygen-scavenging polyester concentrates are prepared with significant amounts of 3-hexenedioic acid residues and aliphatic dicarboxylic acid residues such as adipic acid residues, polymerization is satisfactory at relatively low temperatures. Further benefits are as set forth below.

These oxygen-scavenging polyester concentrates may be blended with a transition metal oxidation catalyst and one or more polyesters having terephthalic acid residues, such as one or more polyethylene terephthalate homopolymers or copolymers ("PET polymers"), as further described herein, to provide improved oxygen-scavenging effect when compared with blends lacking residues of 3-hexenedioic acid, while providing the properties that make the blends suitable for use in packaging applications.

The oxygen-scavenging polyester concentrates of the invention may thus comprise, for example, from about 0.5 mole percent up to 100 mole percent, or from 1 mole percent to 90 mole percent, or from 5 mole percent to 75 mole percent residues of 3-hexenedioic acid, based on the total amount of dicarboxylic acids in the polyester comprising 100 mole percent. Alternatively, the residues of 3-hexenedioic acid may be present in an amount of at least about 0.25 mole percent, or at least 0.5 mole percent, or at least 1 mole percent, or at least 5 mole percent, or at least 10 mole percent, up to about 20 mole percent, or up to 50 mole percent, or up to 70 mole percent, or up to 75 mole percent, or up to 90 mole percent, or more, in each case based on the total amount of dicarboxylic acids in the polyester comprising 100 mole percent.

The oxygen-scavenging polyester concentrates according to the invention may further comprise residues of adipic acid and/or other aliphatic acid present, for example, in an amount from about 5 mole percent up to about 95 mole percent, or from 10 mole percent to 90 mole percent, or from 15 mole percent to 75 mole percent, based on the total amount of dicarboxylic acids in the polyesters of the oxygen-scavenging polyester concentrates comprising 100 mole percent. Alternatively, adipate residues may be present in an amount of at least about 5 mole percent, or at least 10 mole percent, or at least 15 mole percent, or at least 20 mole percent, up to about 50 mole percent, or up to 60 mole percent, or up to 70 mole percent, or up to 75 mole percent, or up to 90 mole percent, or up to 95 mole percent in each case based on the total amount of dicarboxylic acids in the polyester concentrates comprising 100 mole percent.

These oxygen-scavenging concentrates may optionally contain residues of other dicarboxylic acids or anhydrides, whether aliphatic, alicyclic, or aryl dicarboxylic acids, so long as the residues of 3-hexenedioic acid comprise, for example, at least 0.5 mole percent of the dicarboxylate residues of the polyesters, or at least 1 mole percent, or at least 1.5 mole percent, or from 0.5 to 100 mole percent, or from 1 to 99 mole percent, or from 2.5 mole percent to 95 mole percent, in each case based on the total amount of dicarboxylate residues of the concentrates comprising 100 mole percent.

These oxygen-scavenging polyester concentrates may further comprise residues from one or more additional aliphatic dicarboxylic acids, having from 2-12 carbon atoms, such as pimelic acid, suberic acid, azelaic acid, sebacic acid, undecandioic acid, dodecandioic acid, or 1,4-cyclohexanedicarboxylic acid. The mole percent values given are, in each case, based on the entire dicarboxylic acid content of the polyesters totaling 100 mole percent. In order to be polymerized at relatively low polymerization temperatures, they will typically comprise substantial amounts of such aliphatic dicarboxylic acids, for example in amounts of at least 10 mole percent, or at least 20 mole percent, or at least 35 mole percent, or at least 50 mole percent, in addition to any adipic acid present, and based on the entire dicarboxylic acid content of the concentrates totaling 100 mole percent.

In addition to the residues of 3-hexenedioic acid and the optional adipate residues, these concentrates may comprise amounts of aromatic dicarboxylic acids such as terephthalic acid, isophthalic acid, or naphthalene dicarboxylic acid, for example in total amounts up to about 5 mole percent, or up to 20 mole percent, it being understood that the use of such aromatic dicarboxylic acids may increase the polymerization temperatures needed to prepare the concentrates at a commercially acceptable rate. Thus, these optional aromatic dicarboxylic acids will typically be used in relatively small amounts when a concentrate is intended. Indeed, in some embodiments, the oxygen-scavenging polyester concentrates may comprise substantially no aromatic residues. The aromatic residues of the invention would then be provided, for example, by the PET homopolymers or copolymers with which these concentrates may be blended.

For example, terephthalic acid, if present in these concentrates in minor amounts, will typically be present in an amount of no more than 20 mole percent, or no more than 15 mole percent, or no more than 10 mole percent, or no more than 5 mole percent, or even 2 mole percent or less, in each case based on the total amount of dicarboxylic acids present comprising 100 mole percent. In some embodiments, the oxygen-scavenging polyester concentrates may comprise substantially no terephthalic residues.

Similarly, isophthalic acid, if present in the concentrates in minor amounts, will typically be present in amounts of no more than 20 mole percent, or no more than 15 mole percent, or no more than 10 mole percent, or no more than 5 mole percent, or even 2 mole percent or less, in each case based on the total amount of dicarboxylic acids present in the concentrates comprising 100 mole percent. In some embodiments, the oxygen-scavenging polyester concentrates may comprise substantially no isophthalic residues.

These oxygen-scavenging concentrates will further comprise residues of one or more aliphatic, alicyclic, or aryl diols, and especially aliphatic diol residues such as those from ethylene glycol. Because the use of ethylene glycol permits relatively low polymerization temperatures and is relatively inexpensive, the concentrates may comprise ethylene glycol in substantial amounts, for example at least 30 mole percent, or at least 50 mole percent, or at least 75 mole percent, or at least 90 mole percent, in each instance based on the entire amount of diol content in the oxygen-scavenging polyesters comprising 100 mole percent. Other aliphatic diols that may be useful to prepare these concentrates, and that do not unduly raise the needed polymerization temperatures, include, in addition to or in place of a portion of the ethylene glycol, diethylene glycol (DEG); triethylene glycol; 1,4-cyclohexanedimethanol; propane-1,3-diol; butane-1,4-diol; and hexane-1,6-diol.

Diethylene glycol (DEG), if present in these concentrates, will typically be present in amounts of no more than 20 mole percent, or no more than 15 mole percent, or no more than 10 mole percent, or no more than 5 mole percent, or even 2 mole percent or less, in each case based on the total amount of diols present in the oxygen-scavenging polyester concentrates comprising 100 mole percent. In some embodiments, the concentrates will comprise substantially no diethylene glycol intentionally added to the polymerization process, such that any diethylene glycol present is that formed during the polymerization process.

1,4-cyclohexanedimethanol, if present in these concentrates, will typically be present in amounts of no more than 20 mole percent, or no more than 15 mole percent, or no more than 10 mole percent, or no more than 5 mole percent, or even 2 mole percent or less, in each case based on the total amount of diols present in these concentrates comprising 100 mole percent. In some embodiments, these oxygen-scavenging polyester concentrates will comprise substantially no 1,4-cyclohexanedimethanol.

In embodiments in which the oxygen-scavenging polyester concentrates comprise residues of 3-hexenedioic acid and a substantial amount of an alkyl dicarboxylic acid such as adipic acid, the polyesters are characterized as being readily polymerizable at a temperature at which the residues of 3-hexenedioic acid maintain significant oxygen-scavenging effect, for example at temperatures from about 180 to about 240° C., or from 190 to 230° C., or from 200 to 220° C. The processes of polymerization are otherwise similar to those by which PET homopolymers and copolymers are typically prepared, and in certain aspects further described below, 3-hexenedioic acid is directly polymerized in a mixture comprising 3-hexenedioic acid, ethylene glycol, and terephthalic acid to provide the polyester compositions of the invention suitable for packaging.

In one aspect, these oxygen-scavenging polyester concentrates may be prepared using a variety of polymerization processes, for example by reacting one or more diols with a diacid or diester component comprising from about 5 mole percent to about 100 mole percent residues of 3-hexenedioic acid or a corresponding ester, based on the total amount of dicarboxylic acids in the oxygen-scavenging polyester concentrates comprising 100 mole percent. Alternatively, the residues of 3-hexenedioic acid may be present in an amount of at least 5 to about 95 mole percent, optionally with adipic acid in amounts, for example, from about 5 mole percent to about 95 mole percent, and a diol component comprising, for example, at least 25 mole percent, or at least 30 mole percent, or at least 50 mole percent, ethylene glycol, in each case based on the total amount of dicarboxylates and diols in the polyester concentrates each comprising 100 mole percent. It may thus be preferable that the diacid component include substantial amounts of aliphatic and cycloaliphatic acid residues, including at least residues of 3-hexenedioic acid and adipate residues, and that the diol component include substantial amounts of ethylene glycol. As used throughout the specification, the mole percentage for all the diacid component(s) totals 100 mole percent, and the mole percentage for all the diol component(s) totals 100 mole percent.

Because the oxygen-scavenging effect of the residues of 3-hexenedioic acid may be lost at high polymerization temperatures, through cross-linking and other undesirable reactions, these oxygen-scavenging polyester concentrates may include substantial amounts of adipic acid in order to lower the temperature needed to achieve a satisfactory polymerization rate, a temperature at which the residues of 3-hexenedioic acid retain substantial oxygen-scavenging effect following polymerization.

In addition to adipic acid, other monomers may be incorporated into the oxygen-scavenging polyester concentrates, in order to obtain a polymerization temperature suitable for incorporating residues of 3-hexenedioic acid, and are further described elsewhere herein.

Thus, according to one aspect of the invention, residues of 3-hexenedioic acid may be provided to an oxygen-scavenging polyester composition via one or more polyesters that are considered to provide oxygen-scavenging polyester "concentrates," and that may include monomers such as adipic acid that permit a relatively low temperature of polymerization. Additional dicarboxylic acids that may be used to prepare such polyesters include phthalic acid, isophthalic acid, terephthalic acid, naphthalene-2,6-dicarboxylic acid, cyclohexanedicarboxylic acid, cyclohexanediacetic acid, diphenyl-4,4'-dicarboxylic acid, succinic acid, glutaric acid, azelaic acid, sebacic acid, and the like, with terephthalic acid, isophthalic acid, naphthalene-2,6-dicarboxylic acid, and cyclohexanedicarboxylic acid being especially suitable. Those skilled in the art will readily appreciate that aliphatic dicarboxylic acids may be used in addition to, or in place of at least a portion of, the adipic acid, and have relatively little effect on the temperatures needed to obtain a satisfactory polymerization rate.

Cyclohexanedicarboxylic acid, if present in the oxygen-scavenging polyester concentrates in minor amounts, will typically be present in amounts of no more than 10 mole percent, or no more than 5 mole percent, or no more than 2 mole percent, in each case based on the entire amount of dicarboxylic acids comprising 100 mole percent.

Diols useful to prepare these concentrates include, in addition to or in place of a portion of the ethylene glycol, cycloaliphatic diols having 6 to 20 carbon atoms and aliphatic diols having 2 to 20 carbon atoms. Examples of such diols include diethylene glycol (DEG); triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propanediol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane. Any additional diols are advantageously chosen such that they do not unduly raise the temperature needed to obtain a satisfactory rate of polymerization.

In addition to residues of 3-hexenedioic acid and adipate residues, the acid residues may thus include those derived from one or more other dicarboxylic acids, such as aromatic dicarboxylic acids having from 8 to 14 carbon atoms, other aliphatic dicarboxylic acids, having 4 to 12 carbon atoms, or cycloaliphatic dicarboxylic acids having 8 to 12 carbon atoms.

Examples of dicarboxylic acid units useful for the acid component are units from phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, azelaic acid, sebacic acid, and the like, with isophthalic acid, terephthalic acid being suitable in relatively small amounts. As noted, the use of the corresponding acid anhydrides, esters, and acid chlorides of these acids is included in the term "dicarboxylic acid".

In addition to units derived from ethylene glycol, the diol component of these oxygen-scavenging concentrates may include units from additional diols including cycloaliphatic diols having 6 to 20 carbon atoms and aliphatic diols having 2 to 20 carbon atoms. Examples of such diols include diethylene glycol (DEG); triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane.

These oxygen-scavenging polyester concentrates comprising residues of 3-hexenedioic acid, and optionally adipate residues, may use relatively low polymerization temperatures, but may otherwise be prepared by conventional polymerization procedures sufficient to effect esterification and polycondensation as described in further detail below with respect to polyethylene terephthalate homopolymers and copolymers. Polyesters prepared with 3-hexenedioic acid and adipic acid are further characterized as having relatively low intrinsic viscosities, and as requiring lower polymerization temperatures to obtain a satisfactory rate of polymerization than do packaging polyesters such as PET polymers.

In the exemplary embodiments described below, ethylene glycol may be present as the diol in an amount, for example, of at least 50 mole percent, or at least 75 mole percent, or at least 90 mole percent, based on the total amount of diol content in the polyesters comprising 100 mole percent. When smaller amounts of ethylene glycol are used, one or more of the time, temperature, and pressure values will be different.

Thus, the oxygen-scavenging polyester concentrates of the invention comprising residues of 3-hexenedioic acid and adipate residues are characterized as being capable of being produced at polycondensation temperatures from about 180 to about 240° C., or from 190 to 230° C., or from 200 to 220° C., at a final vacuum of about 0.8 torr, for example, to achieve an ItV, for example, up to about 0.3 dL/g, or up to about 0.7 dL/g.

Alternatively, the oxygen-scavenging polyester compositions comprising residues of 3-hexenedioic acid and adipate residues may be produced at polycondensation temperatures from about 250 to about 275° C., or from 255 to 270° C., or from 260 to 265° C., at a final vacuum of about 0.8 torr, for example, to achieve an ItV, for example, up to about 0.6 dL/g, or up to about 0.8 dL/g.

Similarly, when the oxygen-scavenging polyester concentrates comprise from about 10 mole percent to about 90 mole percent residues of 3-hexenedioic acid, and from about 10 mole percent to about 90 mole percent adipate residues, an ItV of at least 0.4 dL/g, for example, may be achieved at final polycondensation temperatures from about 200° C. to about 220° C., at a final vacuum from about 0.5 to about 0.8 torr.

In another aspect, polyester melt phase manufacturing processes suitable to prepare these concentrates include direct condensation of a dicarboxylic acid with a diol optionally in the presence of esterification catalysts in the esterification zone, followed by polycondensation in the prepolymer and finishing zones in the presence of a polycondensation catalyst; or else ester interchange usually in the presence of a transesterification catalyst in the esterification zone, followed by prepolymerization and finishing in the presence of a polycondensation catalyst.

These oxygen-scavenging concentrates are further characterized as being more soluble in common organic solvents than PET homopolymers and copolymers, and as having lower melting temperatures.

In other respects, the polyesters intended as concentrates may be prepared using processes similar to those used for the polyethylene terephthalate homopolymers or copolymers with which they may be blended.

In a significant aspect, the invention relates to oxygen-scavenging polyester compositions in which the terephthalic acid residues are provided by one or more polyethylene terephthalate homopolymers or copolymers ("PET polymers"), present in an amount, for example, of at least about 50 wt. %, or at least 75 wt. %, or at least 85 wt. %, or at least 90 wt. %, or at least 95 wt. %, in each case with respect to the total weight of the polyester blends. In this aspect, the oxygen-scavenging polyester compositions of the invention may substantially retain the separate properties of the polymers from which they are derived; may undergo a moderate amount of transesterification due to the elevated temperature, and depending in part on the length of time the blend is maintained at the elevated temperature; or may so substantially transesterify that the blend is a substantially random polyester in which it is difficult to separately identify the original polymers of which the blend is comprised.

Alternatively, the residues of 3-hexenedioic acid may be directly polymerized into a polymerization process for preparing polyethylene terephthalate homopolymers or copolymers, as further described below. When directly incorporated into polyethylene terephthalate homopolymers or copolymers during polymerization, a portion of the residues of 3-hexenedioic acid may not survive the polymerization temperatures typically used for preparing polyethylene terephthalate homopolymers or copolymers, perhaps requiring either that the amount of 3-hexenedioic acid used be increased, or that the polymerization temperature be lowered, or both. In a preferred embodiment, oxygen-scavenging polyester concentrates having a substantial content of residues of 3-hexenedioic acid are prepared at moderate polymerization temperatures, as already described, and these oxygen-scavenging polyester concentrates are afterward blended with one or more polyethylene terephthalate homopolymers or copolymers to obtain an oxygen-scavenging polyester composition having an effective amount of residues of 3-hexenedioic acid, and having properties suitable for packaging applications.

The PET polymers useful to prepare the polyester compositions of the invention, or in which the residues of 3-hexenedioic acid may be directly incorporated during polymerization or via transesterification, are thermoplastic polyesters, and may include minor amounts of linkages other than ester linkages, such that they may be, for example, polyether esters, polyester amides, or polyetherester amides. It is understood that the particular polyester species is dependant on the starting materials, i.e., polyester precursor reactants and/or components. Typically, however the PET polymers are polyesters, and lack significant amounts of other linkages. Typical amounts of ester linkages in the PET polymers according to the invention are at least 50 percent ester linkages, or at least 75 percent ester linkages, or at least 90 percent ester linkages, or at least 95 percent ester linkages, in each instance based on the total number of residue linkages of which the PET polymers are comprised. In one aspect the polyester compositions of the invention are comprised substantially entirely of ester linkages.

The polyester compositions of the invention may thus comprise oxygen-scavenging concentrates blended with one or more polyethylene terephthalate homopolymers and copolymers. These blends may be blended in a variety of manners, for instance by melt blending in which both polymers are fully or partially melted, by melt blending via an extruder, by physical mixing followed by melting or further mixing at elevated temperatures, or the like. Similarly, these compositions may maintain significant properties of concentrate and the PET polymer of which they are comprised. Alternatively, the concentrate and the PET polymer may be partially transesterified, such that the blend comprises a block copolyester in which portions of the transesterified product are derived and identifiable as being derived from the two polymers which were blended. In yet another alternative, the concentrate and the PET polymer may be transesterified such that the blended product is a substantially randomized copolymer, in which it may be difficult or not possible to identify the separate polyesters from which the blend was derived.

The PET homopolymers and copolymers useful to prepare polyester blends according to the invention, and those in which 3-hexenedioic acid may be incorporated during polymerization, are thus comprised of repeating units of polyethylene terephthalate, in an amount of at least 60 mole percent, or at least 75 mole percent, or at least 80 mole percent, or at least 85 mole percent, or at least 90 mole percent, or at least 95 mole percent, or at least 96 mole percent, in each case based on the total moles of dicarboxylic acid/diol units in the compositions comprising 100 mole percent. Thus, the PET polymers may comprise a homopolymer comprised of ethylene terephthalate units, or, for example, a copolyester of ethylene terephthalate units and other units derived from an alkylene glycol or aryl glycol with an aliphatic or aryl dicarboxylic acid, with or without residues of 3-hexenedioic acid.

Examples of other repeating polyester units that may be present in minor amounts in the polyester compositions of the invention include, in addition to the repeating ethylene terephthalate units just described, polyethylene naphthalate (PEN), poly(1,4-cyclo-hexylenedimethylene) terephthalate (PCT), poly(ethylene-co-1,4-cyclohexylenedimethylene terephthalate) (PETG), copoly(1,4-cyclohexylene dimethylene/ethylene terephthalate) (PCTG), poly(1,4-cyclohexylene dimethylene terephthalate-co-isophthalate) (PCTA), and poly(ethylene terephthalate-co-isophthalate) (PETA).

The form of the polyester compositions of the invention is not limited, nor the method of preparation, and includes a melt in the manufacturing process or in the molten state after polymerization, such as may be found in an injection molding machine, and in the form of a liquid, pellets, preforms, and/or bottles. The polyesters may be in the form of pellets isolated as a solid at 25° C. and 1 atm in order for ease of transport and processing. The shape of such pellets is not limited, and is typified by regular or irregular shaped discrete particles and may thus be distinguished from a sheet, film, or fiber.

The PET polymers useful according to the invention may be prepared by transesterifying a dialkyl terephthalate or naphthalate or by directly esterifying a terephthalic acid or naphthalene dicarboxylic acid with a diol. Further details of such processes are set forth below.

The PET polymers of the invention may be manufactured by reacting a diacid or diester component comprising at least 75 mole percent terephthalic acid or $C_1$-$C_4$ dialkylterephthalate, or at least 80 mole percent, or at least 85 mole percent, or at least 90 mole percent, and for many applications at least 95 mole percent, and a diol component comprising, for example, at least 50 mole percent ethylene glycol, or at least 75 mole percent ethylene glycol, or at least 80 mole percent, or at least 85 mole percent, or at least 90 mole percent, and for many applications, at least 95 mole percent. It is thus preferable that the diacid component is terephthalic acid and the diol component is ethylene glycol. As used herein, the mole percentage for all the diacid component(s) totals 100 mole percent, and the mole percentage for all the diol component(s) totals 100 mole percent.

The resulting polyester compositions of the invention may include admixtures of polyalkylene terephthalates, PEN, or mixtures thereof, along with other thermoplastic polymers, such as polycarbonates and polyamides. It is preferred that the oxygen-scavenging polyester compositions of the invention are primarily comprised of polyethylene terephthalate polymers or copolymers, for example in an amount of at least 75 wt. %, or at least 80 wt. %, or at least 95 wt. %, based on the weight of polymers (excluding fillers, compounds, inorganic compounds or particles, fibers, impact modifiers, or other polymers which may form a discontinuous phase). In addition to units derived from terephthalic acid, the acid component of the polyester compositions may be modified with, or replaced by, units derived from one or more other dicarboxylic acids, such as aromatic dicarboxylic acids preferably having from 8 to 14 carbon atoms, aliphatic dicarboxylic acids preferably having 4 to 12 carbon atoms, or cycloaliphatic dicarboxylic acids preferably having 8 to 12 carbon atoms.

Examples of dicarboxylic acid units useful for the acid component are units from phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being preferable.

As noted, the use of the corresponding acid anhydrides, esters, and acid chlorides of these acids is included in the term "dicarboxylic acid".

In addition to units derived from ethylene glycol, the diol component of the PET polymers may be modified with, or replaced by, units from additional diols including cycloaliphatic diols having 6 to 20 carbon atoms and aliphatic diols having 2 to 20 carbon atoms. Examples of such diols include diethylene glycol (DEG); triethylene glycol; 1,4-cyclohexanedimethanol; propane-1,3-diol; butane-1,4-diol; pentane-1,5-diol; hexane-1,6-diol; 3-methylpentanediol-(2, 4); 2-methylpentanediol-(1,4); 2,2,4-trimethylpentane-diol-(1,3); 2,5-ethylhexanediol-(1,3); 2,2-diethyl propane-diol-(1, 3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane.

The PET polymers may be prepared by conventional polymerization procedures sufficient to effect esterification and polycondensation, the processes characterized by having polymerization temperatures that may be relatively high when compared with those used to form polyester concentrates in which residues of 3-hexenedioic acid are present in substantial amounts. Polyester melt phase manufacturing processes include direct condensation of a dicarboxylic acid with a diol optionally in the presence of esterification catalysts in the esterification zone, followed by polycondensation in the prepolymer and finishing zones in the presence of a polycondensation catalyst; or else ester interchange usually in the presence of a transesterification catalyst in the esterification zone, followed by prepolymerization and finishing in the presence of a polycondensation catalyst, and each may optionally be subsequently solid-stated according to known methods. After melt phase polycondensation, and optional solid-stating, the PET polymers typically have an initial intrinsic viscosity (It.V.) ranging from 0.55 dL/g to about 0.70 dL/g as precursor pellets, if solid-stating is to be performed, and a final It.V. ranging from about 0.70 dL/g to about 1.15 dL/g.

Alternatively, the PET polymers of the polyester compositions of the invention may be prepared entirely in the melt phase, by continuing melt-phase polycondensation such that the PET polymers made in this manner have an It.V. of at least 0.75 dL/g, or at least 0.8 dL/g, or at least 0.82 dL/g.

To further illustrate, a mixture of one or more dicarboxylic acids, including terephthalic acid or ester forming derivatives thereof, and one or more diols, including ethylene glycol, are continuously fed to an esterification reactor operated at a temperature of between about 200° C. and 300° C., typically from 230° C. to 290° C., or from 240 to 270° C., and at a pressure from about 1 psig to about 70 psig. The residence time of the reactants typically ranges from about one to about five hours. Normally, the dicarboxylic acid is directly esterified with diol(s) at elevated pressure and at a temperature from about 240° C. to about 270° C. The esterification reaction is continued until a degree of esterification of at least 60% is achieved, but more typically until a degree of esterification of at least 85% is achieved to make the desired monomer. The esterification monomer reaction is typically uncatalyzed in the direct esterification process and catalyzed in transesterification processes. Polycondensation catalysts may optionally be added in the esterification zone along with esterification/transesterification catalysts.

Typical esterification/transesterification catalysts which may be used include titanium alkoxides, dibutyl tin dilaurate, used separately or in combination, optionally with zinc, manganese, or magnesium acetates or benzoates and/or other such catalyst materials as are well known to those skilled in the art. Phosphorus-containing compounds and cobalt compounds may also be present in the esterification zone. The resulting products formed in the esterification zone include monomer, low molecular weight oligomers, DEG, and water as the condensation by-product, along with other trace impurities formed by the reaction of the catalyst and other compounds such as colorants or the phosphorus-containing compounds. The relative amounts of monomer and oligomeric species will vary depending on whether the process is a direct esterification process, in which case the amount of oligomeric species are significant and even present as the major species, or a transesterification process, in which case the relative quantity of monomer predominates over the oligomeric species. The water is removed as the esterification reaction proceeds and excess glycol is removed to provide favorable equilibrium conditions. The esterification zone typically produces the monomer and oligomer mixture, if any, continuously in a series of one or more reactors. Alternatively, the monomer and oligomer mixture could be produced in one or more batch reactors.

Once the ester monomer or oligomer is made to the desired degree of esterification, it is transported from the esterification reactors in the esterification zone to the polycondensation zone comprised of a prepolymer zone and a finishing zone.

Polycondensation reactions are initiated and continued in the melt phase in a prepolymerization zone and finished in the melt phase in a finishing zone, after which the melt may be solidified into precursor solids in the form of chips, pellets, or any other shape. For convenience, solids are referred to as pellets, but it is understood that a pellet can have any shape, structure, or consistency. If desired, the polycondensation reaction may be continued by solid-stating the precursor pellets in a solid-stating zone. Alternatively, the ItV build may be accomplished entirely in the melt phase, and a subsequent solid-stating step omitted entirely.

Although reference is made to a prepolymer zone and a finishing zone, it is to be understood that each zone may comprise a series of one or more distinct reaction vessels operating at different conditions, or the zones may be combined into one reaction vessel using one or more sub-stages operating at different conditions in a single reactor. That is, the prepolymer stage can involve the use of one or more reactors operated continuously, one or more batch reactors or even one or more reaction steps or sub-stages performed in a single reactor vessel. In some reactor designs, the prepolymerization zone represents the first half of polycondensation in terms of reaction time, while the finishing zone represents the second half of polycondensation. While other reactor designs may adjust the residence time between the prepolymerization zone to the finishing zone at about a 2:1 ratio, a common distinction in all designs between the prepolymerization zone and the finishing zone is that the latter zone operates at a higher temperature, lower pressure, and a higher surface renewal rate than the operating conditions in the prepolymerization zone. Generally, each of the prepolymerization and the finishing zones comprise one or a series of more than one reaction vessel, and the prepolymerization and finishing reactors are sequenced in a series as part of a continuous process for the manufacture of the polyester polymer.

In the prepolymerization zone, also known in the industry as the low polymerizer, the low molecular weight monomers and minor amounts of oligomers are polymerized via polycondensation to form polyethylene terephthalate polyester in the presence of a catalyst. If the catalyst was not added in the monomer esterification stage, the catalyst is added at this stage to catalyze the reaction between the monomers and low molecular weight oligomers to form prepolymer and split off the diol as a by-product. If a polycondensation catalyst was added to the esterification zone, it is typically blended with the diol and fed into the esterification reactor as the diol feed. Other compounds such as phosphorus-containing compounds, cobalt compounds, and colorants can also be added in the prepolymerization zone. These compounds may, however, be added in the finishing zone instead of or in addition to the prepolymerization zone.

In a typical ester interchange process, those skilled in the art recognize that other catalyst material and points of adding the catalyst material and other ingredients may vary from a typical direct esterification process.

Typical polycondensation catalysts include the compounds of antimony, titanium, germanium, zinc, and tin in an amount ranging from 0.1 ppm to 1,000 ppm based on the weight of resulting polyester polymer. A common polymerization catalyst added to the prepolymerization zone is an antimony-based polymerization catalyst. Suitable antimony-based catalysts include antimony (III) and antimony (V) compounds recognized in the art, and in particular, diol-soluble antimony (III) and antimony (V) compounds with antimony (III) being most commonly used. Other suitable compounds include those antimony compounds that react with, but are not necessarily soluble in, the diols, with examples of such compounds including antimony (III) oxide. Specific examples of suitable antimony catalysts include antimony (III) oxide and antimony (III) acetate, antimony (III) glycolates, antimony (III) ethyleneglycoxide and mixtures thereof, with antimony (III) oxide being preferred. The preferred amount of antimony catalyst added is that effective to provide a level of between about 75 ppm and about 400 ppm of antimony by weight of the resulting polyester.

This prepolymer polycondensation stage generally employs a series of two or more vessels and is operated at a temperature from about 250° C. to about 305° C. for from about one to about four hours. During this stage, the It.V. of the monomers and oligomers is typically increased up to about no more than 0.35 dL/g. The diol byproduct is removed from the prepolymer melt using an applied vacuum ranging from 15 torr to 70 torr to drive the reaction to completion. In this regard, the polymer melt is typically agitated to promote the escape of the diol from the polymer melt and to assist the highly viscous polymer melt in moving through the polymerization vessels. As the polymer melt is fed into successive vessels, the molecular weight and thus the intrinsic viscosity of the polymer melt increases. The temperature of each vessel is generally increased and the pressure decreased to allow for a greater degree of polymerization in each successive vessel. However, to facilitate removal of glycols, water, alcohols, aldehydes, and other reaction products, the reactors are typically run under a vacuum or purged with an inert gas. Inert gas is any gas which does not cause unwanted reaction or product characteristics at reaction conditions. Suitable gases include, but are not limited to, carbon dioxide, argon, helium, and nitrogen.

Once an It.V. of typically no greater than 0.35 dL/g, or no greater than 0.40 dL/g, or no greater than 0.45 dL/g, is obtained, the prepolymer is fed from the prepolymer zone to a finishing zone where the second half of polycondensation is continued in one or more finishing vessels ramped up to higher temperatures than present in the prepolymerization zone, perhaps to a value within a range of from 280° C. to 305° C., until the It.V. of the melt is increased from the It.V of the melt in the prepolymerization zone (typically 0.30 dL/g but usually not more than 0.35 dL/g) to an It.V, for example, in the range of from about 0.50 dL/g to about 0.70 dL/g. The final vessel, generally known in the industry as the "high polymerizer," "finisher," or "polycondenser," is operated at a pressure lower than used in the prepolymerization zone, typically within a range of between about 0.8 torr and 4.0 torr, or from about 0.5 torr to about 4.0 torr. Although the finishing zone typically involves the same basic chemistry as the prepolymer zone, the fact that the size of the molecules, and thus the viscosity, differs, means that the reaction conditions also differ. However, like the prepolymer reactor, each of the finishing vessel(s) is connected to a flash vessel and each is typically agitated to facilitate the removal of ethylene glycol.

Alternatively, if a melt-phase-only polycondensation process is employed in the absence of a solid-stating step, the finisher is operated under similar temperatures and pressures, except that the It.V. of the melt is increased in the finisher to an It.V. in the range of from about 0.70 dL/g up to about 1.0 dL/g, or up to 1.1 dL/g, or up to 1.2 dL/g.

The PET homopolymers or copolymers of the present invention may include a catalyst system comprising aluminum atoms, for example in an amount of at least 3 ppm based on the weight of the polymer, as well as one or more alkaline earth metal atoms, alkali metal atoms, or alkali compound residues, for example lithium. Such polymers typically have an It.V. of at least 0.72 dL/g obtained during melt phase polymerization.

The PET homopolymers or copolymers include those disclosed and claimed in U.S. patent application Ser. No. 11/495,431 filed Jul. 28, 2006 and having common assignee herewith, the disclosure of which is incorporated herein by reference in its entirety.

In another aspect, the PET homopolymers or copolymers comprise aluminum atoms, as well as one or more alkaline earth metal atoms, alkali metal atoms, or alkali compound residues, provided as a catalyst system, and further comprise a catalyst deactivator effective to at least partially deactivate the catalytic activity of the combination of the aluminum atoms and the alkaline earth metal atoms, alkali metal atoms, or alkali compound residues.

In one aspect, the PET homopolymers or copolymers are made by a process comprising polycondensing a polyester polymer melt in the presence of aluminum atoms and one or more alkaline earth metal atoms, alkali metal atoms, or alkali compounds.

In yet another aspect of the invention, the PET homopolymers or copolymers suitable for use according to the invention may be produced by a process that includes a step of adding catalyst deactivator to a polyester melt containing aluminum atoms and alkaline earth metal atoms or alkali metal atoms or alkali compound residues, for example lithium atoms, wherein the catalyst deactivator is added to the polyester melt when one or more of the following conditions are satisfied, or thereafter, and before solidification of the polyester melt:

a) the polyester melt reaches an It.V. of at least 0.50 dL/g, or b) vacuum applied to the polyester melt, if any, is at least partially released, or c) if the polyester melt is present in a melt phase polymerization process, adding the phosphorus compound within a final reactor for making the polyester polymer or between the final reactor and before a cutter for cutting the polyester melt, or d) if the polyester melt is present in a melt phase polymerization process, following at least 85% of the time for polycondensing the polyester melt; or e) the It.V. of the polyester melt is within 0.10 dL/g of the It.V. obtained upon solidification; or f) at a point within 20 minutes or less of solidifying the polyester melt.

Thus, the PET homopolymers or copolymers useful according to the invention comprise, as a catalyst system, aluminum atoms and one or more alkaline earth atoms, alkali metal atoms, or alkali compound residues, optionally deactivated with one or more catalyst deactivators.

The aluminum atoms may be present, for example, in an amount from about 1 ppm to about 35 ppm, or from 5 ppm to 25 ppm, or from 10 ppm to 20 ppm, in each case based on the total weight of the PET polymers.

The one or more alkaline earth atoms, alkali metal atoms, or alkali compound residues may be present, for example, in a total amount from about 1 ppm to about 25 ppm, or from 1 ppm to 20 ppm, or from 5 ppm to 18 ppm, or from 8 ppm to 15 ppm, in each case based on the total weight of the one or more PET homopolymers or copolymers.

In one aspect, the one or more alkaline earth atoms, alkali metal atoms, or alkali compound residues comprises lithium. In this aspect, the amount of lithium may be, for example, from about 1 ppm to about 25 ppm, or from 5 ppm to 20 ppm, or from 8 ppm to 15 ppm, in each case based on the total weight of the PET polymers.

In the processes by which the PET homopolymers or copolymers are prepared, the catalyst systems used may optionally be deactivated by one or more catalyst deactivators, for example phosphorus atoms. If present, the amount of phosphorus atoms may range, for example, up to about 150 ppm, or up to about 115 ppm, or up to about 70 ppm.

In one aspect, the PET polymers may have It.V.'s in the range, for example of about 0.50 to about 1.1, or It.V.'s in the range of 0.70 to 0.85.

In the processes by which the PET homopolymers or copolymers are produced, the final It.V. of the polyester polymer is typically attained entirely in the melt phase polymerization process. This in contrast with conventional processes, in which the molecular weight of the polyester polymer is increased to a moderate It.V., solidified, and then followed by solid-phase polymerization to continue the molecular weight increase to the final desired higher It.V. The conventional process does not permit appreciable catalyst deactivation in the melt phase, because the subsequent solid-phase polymerization requires catalysis. Since the process is capable of building the molecular weight to the desired final It.V. entirely in the melt phase, the catalyst may be at least partially deactivated to thereby avoid at least some of the catalytic activity upon subsequent melting of particles, which is a common contributor to the generation of additional acetaldehyde.

Thus, in one aspect, the PET polymers comprise aluminum atoms, present in an amount of at least 3 ppm based on the weight of the polymer, said polymer having an It.V. of at least 0.72 dL/g obtained through a melt phase polymerization. In some aspects, the PET polymers exhibit a reduced residual acetaldehyde content, for example 10 ppm or less.

In another aspect, the PET polymers comprise: (i) aluminum atoms, (ii) alkaline earth metal atoms or alkali metal atoms or alkali compound residues, and (iii) a catalyst deactivator in an amount effective to at least partially deactivate the catalytic activity of the combination of said (i) aluminum atoms and (ii) alkaline earth metal atoms or alkali metal atoms or alkali compound residues.

The residence time in the polycondensation vessels and the feed rate of the diol and the acid into the esterification zone in a continuous process is determined in part based on the target molecular weight of the polyethylene terephthalate polyester. Because the molecular weight can be readily determined based on the intrinsic viscosity of the polymer melt, the intrinsic viscosity of the polymer melt is generally used to determine polymerization conditions, such as temperature, pressure, the feed rate of the reactants, and the residence time within the polycondensation vessels.

Once the desired It.V. is obtained in the finisher, the melt may be fed to a pelletization zone where it is filtered and extruded into the desired form. The PET polymer may be filtered to remove particulates over a designated size, followed by extrusion in the melt phase to form polymer sheets, filaments, or pellets. Although this zone is termed a "pelletization zone", it is understood that this zone is not limited to solidifying the melt into the shape of pellets, but includes solidification into any desired shape. Preferably, the polymer melt is extruded immediately after polycondensation. After extrusion, the polymer is quenched, preferably by spraying with water or immersing in a water trough, to promote solidification. The solidified condensation polymers are cut into any desired shape, including pellets.

Alternatively, once the PET polymer is manufactured in the melt phase polymerization, it may be solidified. The method for solidifying the PET polymer from the melt phase process is not limited. For example, molten PET polymer from the melt phase may be directed through a die, or merely cut, or both directed through a die followed by cutting the molten polymer. A gear pump may be used as the motive force to drive the molten PET polymer through the die. Instead of using a gear pump, the molten PET polymer may be fed into a single or twin screw extruder and extruded through a die, optionally at a temperature of 190° C. or more at the extruder nozzle. Once through the die, the PET polymer may be drawn into strands, contacted with a cool fluid, and cut into pellets, or the polymer may be pelletized at the die head, optionally underwater. The PET polymer melt is optionally filtered to remove particulates over a designated size before being cut. Any conventional hot pelletization or dicing method and apparatus can be used, including but not limited to dicing, strand pelletizing and strand (forced conveyance) pelletizing, pastillators, water ring pelletizers, hot face pelletizers, underwater pelletizers, and centrifuged pelletizers.

The method and apparatus used to crystallize the polyester polymer is not limited, and includes thermal crystallization in a gas or liquid. The crystallization may occur in a mechanically agitated vessel; a fluidized bed; a bed agitated by fluid movement; an un-agitated vessel or pipe; crystallized in a liquid medium above the glass transition temperature ($T_g$) of the polyester polymer, preferably at 140° C. to 190° C.; or any other means known in the art. Also, the polymer may be strain crystallized. The polymer may also be fed to a crystallizer at a polymer temperature below its $T_g$ (from the glass), or it may be fed to a crystallizer at a polymer temperature above its $T_g$. For example, molten polymer from the melt phase polymerization reactor may be fed through a die plate and cut underwater, and then immediately fed to an underwater thermal crystallization reactor where the polymer is crystallized underwater. Alternatively, the molten polymer may be cut, allowed to cool to below its $T_g$, and then fed to an underwater thermal crystallization apparatus or any other suitable crystallization apparatus. Or, the molten polymer may be cut in any conventional manner, allowed to cool to below its $T_g$, optionally stored, and then crystallized. Optionally, the crystallized polyester may be solid stated according to known methods.

The pellets formed from the condensation polymers may be subjected to a solid-stating zone wherein the solids are first crystallized followed by solid-state polymerization (SSP) to further increase the It.V. of the polyester composition solids from the It.V exiting the melt phase to the desired It.V. useful for the intended end use. Typically, the It.V. of solid stated polyester solids ranges from 0.70 dL/g to 1.15 dL/g. In a typical SSP process, the crystallized pellets are subjected to a countercurrent flow of nitrogen gas heated to 180° C. to 220° C., over a period of time as needed to increase the It.V. to the desired target.

Thereafter, the PET polymer solids may be blended with the oxygen-scavenging polyester concentrates, unless the PET polymers already have incorporated therein residues of 3-hexenedioic acid, to form a packaging composition that may be melted and extruded to form items such as containers (e.g., beverage bottles), filaments, films, or other applications. At this stage, the pellets are typically fed into an injection molding machine suitable for making preforms which are stretch blow molded into bottles.

According to various embodiments of the invention, various additives such as reheat additives, for example titanium nitride particles, may be added at any point during polymerization of the PET polymers, or afterward, including to the esterification zone, to the polycondensation zone comprised of the prepolymer zone and the finishing zone, to or prior to the pelletizing zone, and at any point between or among these zones. The particles may also be added to solid-stated pellets as they are exiting the solid-stating reactor. Furthermore, reheat additives such as titanium nitride particles may be added to the PET pellets in combination with other feeds to the injection molding machine, or may be fed separately to the injection molding machine. For clarification, the particles may be added in the melt phase or to an injection molding machine without solidifying and isolating the polyester composition into pellets. Thus, the particles can also be added in a melt-to-mold process at any point in the process for making the preforms. In each instance at a point of addition, the particles can be added as a powder neat, or in a liquid, or a polymer concentrate, and can be added to virgin or recycled PET, or added as a polymer concentrate using virgin or recycled PET as the PET polymer carrier.

Other components may also be added to the oxygen-scavenging polyester compositions of the present invention to enhance the performance properties of the oxygen-scavenging polyester compositions. For example, crystallization aids, impact modifiers, surface lubricants, denesting agents, compounds, antioxidants, ultraviolet light absorbing agents, catalyst deactivators, colorants, nucleating agents, acetaldehyde reducing compounds, other reheat rate enhancing aids, sticky bottle additives such as talc, and fillers and the like can be included. The oxygen-scavenging polyester compositions may also contain small amounts of branching agents such as trifunctional or tetrafunctional comonomers such as trimellitic anhydride, trimethylol propane, pyromellitic dianhydride, pentaerythritol, and other polyester forming polyacids or diols generally known in the art. All of these additives and many others and their use are well known in the art and do not require extensive discussion. Any of these compounds can be used in the present composition. It is preferable that the present oxygen-scavenging polyester composition be essentially comprised of a blend of PET polymer and oxidation catalyst, with an oxygen-scavenging polyester concentrate comprising residues of 3-hexenedioic acid, with only a modifying amount of other ingredients being present.

The oxygen-scavenging polyester compositions of the invention optionally may contain one or more additional UV-absorbing compounds. One example includes UV-absorbing compounds which are covalently bound to the polyester molecule as either a comonomer, a side group, or an end group. Suitable UV-absorbing compounds are thermally stable at polyester processing temperatures, absorb in the range of from about 320 nm to about 380 nm, and migrate minimally from the polymer. The UV-absorbing compounds preferably provide less than about 20%, more preferably less than about 10%, transmittance of UV light having a wavelength of 370 nm through a bottle wall or sample that is 0.012 inches thick. Suitable chemically reactive UV absorbing compounds may include, for example, substituted methine compounds.

Suitable compounds, their methods of manufacture and incorporation into polyesters include those disclosed in U.S. Pat. No. 4,617,374, the disclosure of which is incorporated herein by reference. Other suitable UV-absorbing materials include benzophenone, benzotriazole, triazine, benzoxazinone derivatives. These UV-absorbing compound(s) may be present in amounts between about 1 ppm to about 5,000 ppm by weight, preferably from about 2 ppm to about 1,500 ppm, and more preferably between about 10 ppm and about 1000 ppm by weight. Dimers of the UV absorbing compounds may also be used. Mixtures of two or more UV absorbing compounds may be used. Moreover, because the UV absorbing compounds are reacted with or copolymerized into the backbone of the polymer, the resulting polymers display improved processability including reduced loss of the UV absorbing compound due to plateout and/or volatilization and the like.

The oxygen-scavenging polyester compositions of the present invention are suitable for forming a variety of shaped articles, including films, sheets, tubes, preforms, molded articles, containers and the like. Suitable processes for forming the articles are known and include extrusion, extrusion blow molding, melt casting, injection molding, stretch blow molding, thermoforming, and the like.

The oxygen-scavenging polyester compositions of the invention may also, optionally, contain color stabilizers, such as certain cobalt compounds. These cobalt compounds can be added as cobalt acetates or cobalt alcoholates (cobalt salts or higher alcohols). They can be added as solutions in ethylene glycol. Polyester resins containing high amounts of the cobalt additives can be prepared as a masterbatch for extruder addition. The addition of the cobalt additives as color toners is a process used to minimize or eliminate the yellow color, measured as b*, of the resin. Other cobalt compounds such as cobalt aluminate, cobalt benzoate, cobalt chloride and the like may also be used as color stabilizers. It is also possible to add certain diethylene glycol (DEG) inhibitors to reduce or prevent the formation of DEG in the final resin product. Preferably, a specific type of DEG inhibitor would comprise a sodium acetate-containing composition to reduce formation of DEG during the esterification and polycondensation of the applicable diol with the dicarboxylic acid or hydroxyalkyl, or hydroxyalkoxy substituted carboxylic acid. It is also possible to add stress crack inhibitors to improve stress crack resistance of bottles, or sheeting, produced from this resin.

The PET polymers, as well as the oxygen-scavenging polyester compositions prepared according to the invention, include those having a second cycle DSC melting point of about 265° C. or less, or about 260° C. or less, or about 255° C. or less, and those having a dry glass transition temperature of about 95° C. or less, or about 90° C. or less. These morphologies are advantageous in terms of providing acceptable processing properties, while achieving an improved oxygen-scavenging effect when compared with the polyesters and polyester compositions lacking residues of 3-hexenedioic acid. We have discovered that when residues of 3-hexenedioic acid are blended with polyesters suitable for packaging compositions, for example in amounts up to about 10 mole percent, that the resulting polyester blends have improved oxygen-scavenging effect, while maintaining the properties that make them useful in packaging.

The intrinsic viscosity (It.V.) values described throughout this description are set forth in dL/g unit as calculated from the inherent viscosity (Ih.V.) measured at 25° C. in 60/40 wt/wt phenol/tetrachloroethane. The inherent viscosity is calculated from the measured solution viscosity. The following equations describe these solution viscosity measurements, and subsequent calculations to Ih.V. and from Ih.V. to It.V:

$$\eta_{inh}=[\ln(t_s/t_o)]/C$$

where $\eta_{inh}$=Inherent viscosity at 25° C. at a polymer concentration of 0.50 g/100 mL of 60% phenol and 40% 1,1,2,2-tetrachloroethane
ln=Natural logarithm
$t_s$=Sample flow time through a capillary tube
$t_o$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int}=lim_{C \to 0}(\eta_{sp}/C)=lim_{C \to 0}\ln(\eta_r/C)$$

where $\eta_{int}$=Intrinsic viscosity
$\eta_r$=Relative viscosity=$t_s/t_o$
$\eta_{sp}$=Specific viscosity=$\eta_r-1$ Instrument calibration involves replicate testing of a standard reference material and then applying appropriate mathematical equations to produce the "accepted" I.V. values.

$$\text{Calibration Factor} = \frac{\text{Accepted } Ih.V. \text{ of Reference Material}}{\text{Average of Triplicate Determinations}}$$

Corrected Ih.V.=Calculated Ih.V.×Calibration Factor

The intrinsic viscosity (It.V. or $\eta_{int}$) may be estimated using the Billmeyer equation as follows:

$$\eta_{int}=0.5[e^{0.5 \times Corrected\ Ih.V.}-1]+(0.75 \times Corrected\ Ih.V.)$$

The oxygen-scavenging polyester compositions of the present invention may be used to form preforms used for preparing packaging containers. The preform is typically heated above the glass transition temperature of the polymer composition by passing the preform through a bank of quartz infrared heating lamps, positioning the preform in a bottle mold, and then blowing pressurized air through the open end of the mold.

A variety of other articles can be made from the oxygen-scavenging polyester compositions of the invention, such as sheet, film, bottles, trays, other packaging, rods, tubes, lids, fibers, and injection-molded articles. Any type of bottle can be made from the oxygen-scavenging polyester compositions of the invention. Thus, in one embodiment, there is provided a beverage bottle made from the oxygen-scavenging polyester compositions of the present invention suitable for holding water. In another embodiment, there is provided a heat-set beverage bottle suitable for holding beverages which are hot-filled into the bottle. In yet another embodiment, the bottle is suitable for holding carbonated soft drinks. Further, in yet another embodiment, the bottle is suitable for holding alcoholic beverages.

The invention also provides processes for making oxygen-scavenging polyester preforms or injection-molded bottles from the oxygen-scavenging polyester compositions of the invention, the processes comprising feeding a liquid or solid PET polymer and a liquid, molten, or solid oxygen-scavenging polyester concentrate to a machine for manufacturing the preform or bottle, the oxygen-scavenging polyester concentrate being as already described elsewhere. According to the invention, not only may the oxygen-scavenging polyester concentrate be added at the stage for making preforms or injection-molded bottles, but in other embodiments, there are provided processes for the manufacture of oxygen-scavenging polyester compositions that comprise adding an oxygen-scavenging polyester concentrate to a melt phase virgin PET polymer, the concentrate comprising residues of 3-hexenedioic acid in an amount sufficient to provide the oxygen-scavenging polyester compositions with substantial oxygen-scavenging effect.

The oxygen-scavenging polyester compositions of the invention may further comprise an oxidation catalyst. The oxidation catalysts useful according to the invention may comprise a transition metal salt, such as a cobalt salt, present in the polyester compositions of the invention in amounts, for example, from about 10 ppm to about 1,000 ppm, or from 20 ppm to 750 ppm, or from 25 ppm to 500 ppm, based on the total weight of the packaging composition. Alternatively, the transition metal salt may be present in the polyester blends of the invention in an amount of at least 10 ppm, or at least 15 ppm, or at least 25 ppm, or at least 50 ppm, up to 500 ppm, or up to 750 ppm, or up to 800 ppm, or up to 1,000 ppm, in each case based on the total weight of the packaging composition. If present in the oxygen-scavenging concentrates of the invention, the transition metal salt may be present in amounts, for example, from about 35 ppm to about 5,000 ppm or more, or from 100 ppm to 3,000 ppm, or from 500 ppm to 2,500 ppm, based on the total weight of the oxygen-scavenging concentrates.

Suitable oxidation catalysts include transition metal catalysts which can readily interconvert between at least two oxidation states. Preferably, the transition metal is in the form of a transition metal salt with the metal selected from the first, second or third transition series of the Periodic Table. Suitable metals include manganese II or III, iron II or III, cobalt II or III, nickel II or III, copper I or II, rhodium II, III or IV and ruthenium I, II or IV. Suitable counterions for the metal include, but are not limited to, chloride, acetate, acetylacetonate, stearate, palmitate, 2-ethylhexanoate, neodecanoate, octanoate, or naphthenate, and mixtures thereof. The metal salt may also be an ionomer, in which case a polymeric counterion is employed. Such ionomers are well known in the art. Any amount of catalyst which is effective in catalyzing oxygen scavenging may be used. Typical amounts in the polyester blends of the invention are at least about 10 ppm, or at least 25 ppm, or at least 50 ppm, or at least 100 ppm, up to about 750 ppm, or up to about 1,000 ppm, or from 50 ppm up to 500 ppm.

Typical amounts of transition metal catalysts, if provided in the oxygen-scavenging polyester concentrates comprising residues of 3-hexenedioic acid, may be even higher, for example at least about 50 ppm, or at least 250 ppm, or at least 500 ppm, up to about 1,000 ppm, or up to about 2,500 ppm, or up to about 5,000 ppm, or up to about 10,000 ppm or more.

These oxygen-scavenging polyester concentrates, when provided to the oxygen-scavenging polyester compositions of the invention in additive amounts, may thus serve also as transition metal catalyst concentrates. We have found cobalt salts to be especially suitable.

When blended with the PET homopolymers and copolymers of the invention, oxygen-scavenging polyester concentrates will typically provide the oxygen-scavenging polyester compositions with, for example, from about 0.01 mole percent to about 10 mole percent residues of 3-hexenedioic acid, or from 0.05 mole percent to 8 mole percent, or from 0.1 mole percent to 5 mole percent, in each case based on the total amount of dicarboxylic acid content in the oxygen-scavenging polyester compositions comprising 100 mole percent. Additional polymers with which the oxygen-scavenging polyester concentrates of the invention may be blended include any of several thermoplastic polymers, as further described herein, and especially one or more thermoplastic polyesters such as polyethylene terephthalate homopolymers or copolymers.

The oxygen-scavenging polyester compositions of the invention thus include, as an oxidation catalyst, a transition metal active for oxidizing an oxidizable component, such as the residues of 3-hexenedioic acid of the invention. The catalyst may or may not be consumed in the oxidation reaction, or if consumed, may only be consumed temporarily by converting back to a catalytically active state.

Examples include cobalt in the +2 or +3 oxidation state, rhodium in the +2 oxidation state, and copper in the +2 oxidation state. The metals may be added in salt form, most conveniently as carboxylate salts, such as cobalt octanoate, cobalt acetate, or cobalt neodecanoate.

The amount of catalyst in the oxygen-containing polyester compositions is an amount effective to actively scavenge oxygen. It is desirable to provide sufficient amounts of oxygen scavenging transition metal catalyst to see significant scavenging effects, and this amount may vary between different transition metals and also depend upon the degree of scavenging desired or needed in the application.

In packaging compositions, amounts ranging from about 10 ppm to about 1,000 ppm are suitable for most applications, or in amounts of at least 10 ppm or at least 30 ppm, or at least 50 ppm, or at least 60 ppm, or at least 75 ppm, or at least 100 ppm. Amounts greater than about 500 ppm, while continuing to be effective, may not provide an incremental improvement sufficient to justify added costs. The reported amounts are based on the weight of the polymer blends and measured on the metal, not its compound weight as added to the composition. In the case of cobalt as the oxygen scavenging transition metal, suitable amounts may be at least 20 ppm, or at least 30 ppm, or at least 50 ppm, or at least 60 ppm, or at least 100 ppm, or at least 125 ppm. The catalyst can be added neat or in a carrier (such as a liquid or wax) to an extruder or other device for making an article comprising the polyester blends of the invention, or it can be added in a concentrate with an additional polyester or other thermoplastic polymer, or in a concentrate with a PET/polyester blend. The carrier may either be reactive or non-reactive with the polyesters and either volatile or non-volatile carrier liquids may be employed. Analogous to the blending protocols described above for the polyester components, it is evident that the transition metal catalyst may be added at a variety of points and via a variety of blending protocols during the preparation of the oxygen-scavenging polyester compositions of the invention. A particularly useful approach is to bring the oxygen-scavenging polyester composition and the transition metal together late in the preparation of the final oxygen-scavenging polyester composition, even as late as in the final melt step before forming the article. In some instances, such as when cobalt is provided as a transition metal, it may be preferred to add the cobalt during blending of the PET polymer and oxygen-scavenging polyester concentrate, rather than earlier, for example during the PET polymerization.

The oxygen-scavenging polyester compositions of the invention may be used to provide packaging compositions having an oxygen transmission rate per day that is reduced when compared to compositions lacking residues of 3-hexenedioic acid. The oxygen transmission rate per day can be advantageously reduced even in the absence of nanocomposite clays or silicates, thereby reducing resin composition costs.

The oxygen-scavenging polyester compositions of the invention may be used in one or more layers of a multi-layered laminate barrier packaging. Such multi-layered packages, however, are expensive to make. An advantage of a preferred embodiment of the invention is that the oxygen-scavenging polyester compositions of the invention may provide both passive barrier to oxygen and active oxygen scavenging in one layer. Accordingly, the invention also relates to providing a mono-layer bottle formed from the oxygen-scavenging polyester compositions of the invention.

The oxygen-scavenging polyester compositions of the invention are useful to make moldings of all types, by extrusion or injection molding, and for making thermoformed articles.

Specific applications include containers and films for packaging of food, beverages, cosmetics, pharmaceuticals, and personal care products where high oxygen scavenging is needed. Examples of beverage bottles include stretch blow-molded and extrusion blow-molded water bottles and for carbonated soft drinks, but the application is particularly useful in bottle applications containing juices, sport drinks, beer, or any other beverage where oxygen detrimentally affects the flavor, fragrance, performance (prevent vitamin degradation), or color of the drink. These polyester blends are also particularly useful in food trays, such as dual ovenable food trays, or cold storage food trays, both in the base container and in the lidding (whether a thermoformed lid or a film), where the freshness of the food contents can decay with the ingress of oxygen. The oxygen-scavenging polyester compositions of the invention also find use in the manufacture of cosmetic containers and containers for pharmaceuticals or medical devices. The oxygen-scavenging polyester compositions of the invention, including the preforms, bottles, sheets, and all the other applications, may be either a single layer of a multi-layer article, or comprise the entire article as a single layer.

In applications where a clear, colorless resin is desired, the slight yellow color generated during processing can be masked by addition of a blue dye. The colorant can be added to either component of the blend during polymerization or added directly to the blend during compounding. If added during blending, the colorant can be added either in pure form or as a concentrate. The amount of a colorant depends on its absorptivity and the desired color for the particular application.

Other typical additives, depending on the application, also include impact modifiers. Suitable impact modifiers for incorporation into polyesters included those disclosed in U.S. Pat. No. 6,986,864, the disclosure of which is incorporated herein by reference. Examples of typical commercially available impact modifiers well-known in the art and useful in this invention include ethylene/propylene terpolymers, styrene based block copolymers, and various acrylic core/shell type impact modifiers. The impact modifiers may be used in conventional amounts from 0.1 to 25 weight percent of the overall composition and preferably in amounts from 0.1 to 10 weight percent of the composition.

In many applications, not only are the packaging contents sensitive to the ingress of oxygen, but the contents may also be affected by ultraviolet (UV) light. Accordingly, it may also be desirable to incorporate into the oxygen-scavenging polyester compositions any one of the known UV absorbing compounds in amounts effective to protect the packaged contents.

Antioxidants may be used with the oxygen-scavenging polyester compositions of the invention to control scavenging initiation. An antioxidant as defined herein is any material that inhibits oxidative degradation or cross-linking of polymers. Typically, such antioxidants are added to facilitate the processing of the polymeric materials and/or prolong their useful lifetime. In relation to this invention, such additives may prolong the induction period for oxygen scavenging given an insufficient thermal history or in the absence of irradiation (photoinitiation). Then when the layer's or article's scavenging properties are required, the layer or article (and any incorporated photoinitiator) can be exposed to radiation, or alternatively, exposed to a sufficient temperature profile. Suitable antioxidants include hindered phenols, phosphites, primary or secondary antioxidants, hindered amine light stabilizers, and the like. Antioxidants such as 2,6-di-(t-butyl)-4-methylphenol (BHT), 2,2'-mthylene-bis(6-t-butyl-p-cresol), triphenylphosphite, tris-(nonylphenyl)phosphite, Irganox 1010 and dilaurylthiodipropionate would be suitable, but not limited to, for use with this invention. Suitable amounts include any amount capable of suppressing oxidative degradation and preferable from about 10 ppm to about 10,000 ppm (1 wt %).

The oxygen-scavenging polyester compositions of the invention may be used alone, or in further polymer blends, or as a layer in a multilayer structure, prepared by co-injection, co-extrusion, lamination, or coating. These multilayer structures can be formed into articles by any forming technique known in the art such as blow molding, thermoforming, and injection molding. Alternatively, the oxygen-scavenging polyester compositions of the present invention may be incorporated into one layer, and a gas barrier polymer may be incorporated into another. Suitable multilayer structures include three layer structures where the oxygen-scavenging polyester composition is incorporated into a center layer, four layer structures where the oxygen-scavenging polyester composition is incorporated into at least one of the intermediate layers, and five layer structures where the oxygen-scavenging polyester composition may be incorporated into either the center layer or the second and fourth layers. In four and five layer articles the additional internal layers may comprise performance polymers such as barrier polymers, recycled polymer, and the like. Additionally the oxygen-scavenging polyester compositions of the present invention may be blended with recycled polymers. Generally the inner and outermost layers will be made from virgin polymer which is suitable for the desired end use. Thus, for example, for a food or beverage container, the inner and outermost layers would be made from a suitable polyester, such as PET.

Preferably, the oxygen-scavenging polyester compositions of the invention are used alone and are prepared in the form of packaging compositions.

This invention can be further illustrated by the following examples of preferred embodiments thereof, although it will be understood that these examples are included merely for purposes of illustration and are not intended to limit the scope of the invention unless otherwise specifically indicated.

EXAMPLES

Example 1

Preparation of Polyethyleneadipate Containing 3-Hexenedioic Acid Residues

A polyethylene adipate copolymer was prepared, containing approximately 10 mole percent 3-hexenedioic acid, comprised of residues from adipic acid, ethylene glycol, and 3-hexenedioic acid. A 500 mL round bottom flask was charged with 80.0 grams of adipic acid, 85.0 grams of ethylene glycol, 10.0 grams of 3-hexenedioic acid, and 0.56 grams of a 0.334 weight percent titanium solution in ethylene glycol where the titanium compound was the monoacetylated form of titanium isopropoxide. The flask was equipped with an overhead stirrer, a nitrogen inlet, a vacuum attachment, and submerged half way into a Belmont metal bath to heat the system. A constant stirrer speed of 100 rpm was maintained throughout the polymerization. The contents of the flask were heated at 190° C. and at atmospheric pressure for 125 minutes followed by a 10 minute ramp to 200° C. and 3.8 torr, which was then held for 30 minutes. Upon completion of this stage, a 5 minute ramp to 0.8 torr was executed with stirrer speed and system temperature held constant. The system was held at these conditions for 120 minutes. Upon completion, the system was cooled to ambient temperature and the polymer was isolated by breaking the flask and removing the polymer from the stirring rod.

GPC analysis of the polymer indicated a Mn of 5,525, a Mw of 18,582 and a Mz of 33,200.

IV of the polymer was 0.328

Examples 2-5

Blending of PEA Concentrates with Polyethylene Terephthalate and Cobalt Neodecanoate A solution of the PEA concentrate prepared in Example 1 was made by combining 15 grams of the polymer of sample 1 with 85 grams ethyl acetate. 1.0 grams of cobalt neodecanoate were dissolved in 99.0 grams of ethyl acetate.

A commercial PET sample was coated with amounts of the above solutions as set out below, the solvent was removed with a nitrogen sweep and vacuum, and the samples were extruded using a DACA microcompounder set at 278° C. The extruded polymer was ground to pass through a 3 mm screen and tested using the OxySense protocol described below.

Example 2

98.0 grams of a commercial PET sample were coated with 13.3 grams of the solution just described and 4.44 grams of the cobalt neodecanoate solution. Upon extrusion, analysis indicated cobalt at a concentration of 89 ppm by weight cobalt.

Example 3

96.5 grams of a commercial PET sample were coated with 23.3 grams of the solution just described and 4.44 grams of the cobalt neodecanoate solution. Upon extrusion, analysis indicated cobalt at a concentration of 95 ppm by weight cobalt.

Example 4

98.0 grams of a commercial PET sample were coated with 13.3 grams of the solution just described and 2.22 grams of the cobalt neodecanoate solution. Upon extrusion, analysis indicated cobalt at a concentration of 37 ppm by weight cobalt.

Example 5

96.5 grams of a commercial PET sample were coated with 23.3 grams of the solution just described and 2.22 grams of the cobalt neodecanoate solution. Upon extrusion, analysis indicated cobalt at a concentration of 47 ppm by weight cobalt.

Oxysense Measurement Technique

The oxygen scavenging performance of the polymers from Examples 2-5 were evaluated using oxygen uptake measurements obtained by means of an OxySense instrument (OxySense Inc. 1311 North Central Expressway, Suite 440 Dallas, Tex. 75243, USA). General principles of operation of the instrument are described in "An Exciting New Non-Invasive Technology for Measuring Oxygen in Sealed Packages the OxySense™ 101" D. Saini and M Desautel, in the Proceedings of Worldpak 2002, published by CRC Press, Boca Raton, Fla. (2002). The procedure used to evaluate the examples is described below.

Oxygen sensitive "OxyDots" supplied by OxySense Inc. were glued to the interior of Wheaton prescored 20 ml glass ampoules (Wheaton #176782) using a silicone adhesive. Approximately 1 gram samples of ground polymer were placed into the 20 ml ampoules (or ampoules). The stems of the ampoules were then sealed using standard glass blowing techniques. The oxygen content in gas phase in the ampoule was measured using the probe on the OxySense instrument to monitor the response of the OxyDot sealed in the ampoule. The instrument converts this reading to oxygen level in contact with the OxyDot. The sealed ampoules were then stored and the oxygen level in the headspace periodically monitored. The oxygen results for replicates were averaged and reported as O2%.

The oxygen scavenging data is given in Table 1 below. Along with the data generated from Examples 2-5, there are two controls; a 0% oxygen control which involved charging an Oxysense ampoule with about 25 grams of Burdick and Jackson water (and about 0.8 grams of sodium sulfite to consume the oxygen present and to prevent bacterial growth), and a 21% oxygen control which was made by charging 5 grams of B & J water to an Oxysense ampoule and measuring oxygen present for each day of the study. One sample was done for each polymer. Calibration controls were sealed and calibrated to get a 0% and 21% control. All of the ampoules were measured by OxySense on the initial day, day "zero", before going into the oven. They were stored in a 40 C oven for the first 8 days of testing and then increased to 75° C. in order to accelerate oxygen scavenging thus shortening the testing period. On the days the samples were tested, they were taken out of the oven, allowed to come to room temp in about 3 hours, and then tested. The control ampoules were kept at room temperature throughout the study. From the data, one can observe that all samples scavenge oxygen.

TABLE 1

Percent Oxygen (Average)

| | Sample # | | | | | |
|---|---|---|---|---|---|---|
| | 1 | 2 | Ex. 2 | Ex. 3 | Ex. 4 | Ex. 5 |
| Day | Description | | | ppm Cobalt | | |
| # | Low Calibration | High Calibration | 89 | 95 | 37 | 47 |
| 0 | −0.05 | 20.7 | 20.2 | 19.5 | 19.6 | 19.5 |
| 1 | 0.09 | 21.0 | 19.8 | 19.7 | 19.7 | 19.7 |
| 2 | −0.04 | 20.5 | 19.7 | 19.6 | 19.0 | 19.8 |
| 3 | 0.03 | 20.6 | 19.8 | 19.2 | 19.4 | 20.0 |
| 8 | 0.07 | 21.2 | 20.4 | 19.1 | 19.7 | 19.7 |
| 10 | −0.1 | 20.5 | 19.9 | 18.4 | 20.0 | 19.8 |
| 13 | 0.02 | 20.7 | 19.0 | 17.4 | 20.0 | 18.8 |
| 16 | 0.02 | 20.8 | 18.1 | 15.8 | 19.8 | 17.5 |
| 20 | 0.05 | 21.0 | 17.3 | 14.7 | 19.6 | 16.3 |
| 23 | −0.1 | 20.9 | 17.0 | 14.3 | 19.2 | 15.5 |
| 28 | −0.2 | 20.3 | 16.4 | 13.5 | 18.6 | 14.8 |
| 35 | −0.05 | 21.0 | 16.0 | 12.8 | 17.7 | 13.9 |
| 43 | 0.05 | 21.0 | 15.6 | 12.3 | 17.1 | 13.1 |
| 56 | 0.06 | 21.1 | 15.3 | 11.4 | 16.2 | 11.8 |

We claim:

1. A polyester composition comprising residues of 3-hexenedioic acid present in an amount from about 0.01 mole percent to about 50 mole percent and residues of terephthalic acid present in an amount of at least 50 mole percent, based on the total amount of residues of dicarboxylic acid in the polyester composition comprising 100 mole percent, and further comprising cobalt present in an amount from about 10 ppm to about 1,000 ppm, based on the total weight of the polyester composition, wherein the polyester composition is comprised of a polyethylene terephthalate homopolymer or copolymer having an It.V. of at least 0.75 dL/g.

2. The polyester composition of claim 1, wherein the residues of 3-hexenedioic acid are present in an amount from about 0.05 mole percent to about 10 mole percent, based on the total amount of residues of dicarboxylic acid or anhydride in the polyester composition comprising 100 mole percent.

3. The polyester composition of claim 1, wherein the residues of 3-hexenedioic acid are present in an amount from about 0.1 mole percent to about 2 mole percent, based on the total amount of residues of dicarboxylic acid or an hydride in the polyester composition comprising 100 mole percent.

4. The polyester composition of claim 1, wherein the residues of terephthalic acid are present in an amount of at least 75 mole percent, based on the total amount of residues of dicarboxylic acid or anhydride in the polyester composition comprising 100 mole percent.

5. The polyester composition of claim 1, wherein the residues of terephthalate acid are present in an amount of at least 90 mole percent, based on the total amount of residues of dicarboxylic acid or anhydride in the polyester composition comprising 100 mole percent.

6. The polyester composition of claim 1, wherein the composition further comprises residues of adipic acid present in an amount up to about 50 mole percent, based on the total amount of residues of dicarboxylic acid or anhydride in the polyester composition comprising 100 mole percent.

7. The polyester composition of claim 6, wherein the residues of adipic acid are present in an amount from about 0.1 mole percent up to about 20 mole percent, based on the total amount of residues of dicarboxylic acid or anhydride in the polyester composition comprising 100 mole percent.

8. The polyester composition of claim 1, wherein the composition further comprises residues of one or more of isophthalic acid or naphthalene dicarboxylic acid in a combined amount of up to about 10 mole percent, based on the total amount of residues of dicarboxylic acids or anhydrides in the polyester composition comprising 100 mole percent.

9. The polyester composition of claim 1, wherein the composition further comprises residues of ethylene glycol, in an amount of at least 30 mole percent, based on the total amount of residues of diols in the polyester composition comprising 100 mole percent.

10. The polyester composition of claim 1, wherein the composition further comprises residues of ethylene glycol, in an amount of at least 95 mole percent, based on the total amount of residues of diols in the polyester composition comprising 100 mole percent.

11. The polyester composition of claim 1, wherein the composition further comprises up to about 5 mole percent diethylene glycol (DEG) residues, based on the total amount of residues of diols in the polyester composition comprising 100 mole percent.

12. The polyester composition of claim 1, wherein the composition further comprises residues of 1,4-cyclohexanedimethanol present in an amount up to 20 mole percent, based on the total amount of residues of diols in the polyester composition comprising 100 mole percent.

13. The polyester composition of claim 1, wherein the cobalt is present in an amount from 20 ppm to 750 ppm, based on the total weight of the polyester composition.

14. The polyester composition of claim 1, wherein the cobalt is present in an amount from 25 ppm to 500 ppm, based on the total weight of the polyester composition.

15. The polyester composition of claim 1, wherein the cobalt comprises a cobalt salt.

16. The polyester composition of claim 1, wherein the cobalt comprises cobalt II or III.

17. The polyester composition of claim 1, wherein the cobalt is provided as one or more of a chloride, an acetate, an acetylacetonate, a stearate, a palmitate, a 2-ethylhexanoate, a neodecanoate, or a naphthenate.

18. The polyester composition of claim 1, wherein the polyethylene terephthalate homopolymer or copolymer is provided in an amount of at least 75 weight percent, based on the total weight of the polyester composition.

19. The polyester composition of claim 18, wherein the polyethylene terephthalate homopolymer or copolymer is present in an amount of at least 95 weight percent, based on the total weight of the polyester composition.

20. The polyester composition of claim 18, wherein the polyethylene terephthalate homopolymer or copolymer is comprised of units of polyethylene terephthalate in an amount of at least 75 mole percent, based on the total moles of dicarboxylic acid/diol units in the polyethylene terephthalate homopolymers or copolymers comprising 100 mole percent.

21. The polyester composition of claim 1, wherein the residues of 3-hexenedioic acid are provided to the composition as a polyester comprising:
    (a) residues of 3-hexenedioic acid in an amount from about 5 mole percent up to 100 mole percent;
    (b) optionally, residues of adipic acid in an amount up to 95 mole percent; and
    (c) ethylene glycol present in an amount at least 50 mole percent,
based on a total amount of 100 mole percent of dicarboxylic acid residues and 100 mole percent diol residues in the polyester composition.

22. The polyester composition of claim 1, wherein the composition is in the form of a blow-molded bottle.

23. The polyester composition of claim 1, wherein the composition is in the form of a bottle preform.

24. A polyester composition comprising residues of 3-hexenedioic acid in an amount from 0.05 mole percent to 2 mole percent and residues of terephthalic acid in an amount of at least 95 mole percent, based on the total amount of dicarboxylic acid residues in the polyester composition comprising 100 mole percent, residues of ethylene glycol, in an amount of at least 95 mole percent, based on the total amount of residues of diols in the polyester composition comprising 100 mole percent, and cobalt present in an amount from about 10 ppm to about 1,000 ppm, based on the total weight of the polyester composition, wherein the polyester composition is comprised of a polyethylene terephthalate having an It.V. of at least 0.75 dL/g.

* * * * *